(12) United States Patent
Starr et al.

(10) Patent No.: US 7,583,507 B2
(45) Date of Patent: Sep. 1, 2009

(54) HIGH DENSITY ARRAY SYSTEM HAVING MULTIPLE STORAGE UNITS WITH ACTIVE MOVABLE MEDIA DRAWERS

(75) Inventors: Matthew Thomas Starr, Lafyette, CO (US); Walter Wong, Boulder, CO (US); Micheal Edward Figaro, Golden, CO (US); Ronald Gregory Duren, Denver, CO (US); Matthew John Ninesling, Littleton, CO (US); Joshua Daniel Carter, Lafyette, CO (US); Scott Edward Bacom, Westminster, CO (US)

(73) Assignee: Spectra Logic Corporation, Denver, CO (US)

( * ) Notice: Subject to any disclaimer, the term of this patent is extended or adjusted under 35 U.S.C. 154(b) by 85 days.

(21) Appl. No.: 11/688,747

(22) Filed: Mar. 20, 2007

(65) Prior Publication Data

US 2007/0233781 A1  Oct. 4, 2007

Related U.S. Application Data

(60) Provisional application No. 60/788,487, filed on Mar. 31, 2006.

(51) Int. Cl.
*H05K 7/16* (2006.01)
(52) U.S. Cl. .................................. 361/727; 361/725
(58) Field of Classification Search ................ 361/725, 361/727
See application file for complete search history.

(56) References Cited

U.S. PATENT DOCUMENTS

| | | | |
|---|---|---|---|
| 3,320,488 A | 5/1967 | Karew | |
| 3,657,608 A | 4/1972 | Leone | |
| 3,710,199 A | 1/1973 | Cignoni | |
| 4,179,724 A | 12/1979 | Bonhomme | |
| 4,660,125 A | 4/1987 | Purdy | |
| 4,686,608 A | 8/1987 | Hosking | |
| 4,899,254 A | 2/1990 | Ferchau | |
| 5,237,484 A | 8/1993 | Ferchau | |
| 5,381,315 A | 1/1995 | Hamaguchi | |

(Continued)

FOREIGN PATENT DOCUMENTS

JP  05041587 A2  2/1992

(Continued)

OTHER PUBLICATIONS

U.S. Appl. No. 11/126,025, Kim et al.

(Continued)

*Primary Examiner*—Jayprakash N Gandhi
*Assistant Examiner*—Anthony M Haughton

(57) ABSTRACT

A storage system is provided having at least one primary storage unit, the primary storage unit having a power source, a server mother board, an expander device connected to a second data storage unit and a plurality of retractable media drawers wherein each of the retractable media drawers comprise a plurality of data storage elements. Each of the retractable media drawers maintain connectivity to the power source, the server mother board and the expander device when each of the media drawers is between a first position that is extended partially away from the primary data storage unit and a second position that is at least partially retracted from the first position towards the primary data storage unit.

20 Claims, 23 Drawing Sheets

U.S. PATENT DOCUMENTS

| | | | |
|---|---|---|---|
| 6,067,711 A | 5/2000 | Ruque | |
| 6,070,742 A * | 6/2000 | McAnally et al. | 211/26 |
| 6,239,975 B1 | 5/2001 | Otis | |
| 6,327,139 B1 | 12/2001 | Champion | |
| 6,459,571 B1 | 10/2002 | Carteau | |
| 6,600,703 B1 | 7/2003 | Emberty et al. | |
| 6,639,751 B2 | 10/2003 | Brace et al. | |
| 6,650,961 B2 | 11/2003 | Deckers | |
| 6,957,291 B2 | 10/2005 | Moon et al. | |
| 6,987,674 B2 * | 1/2006 | El-Batal et al. | 361/788 |
| 7,042,717 B2 * | 5/2006 | El-Batal et al. | 361/685 |
| 7,200,008 B1 * | 4/2007 | Bhugra | 361/724 |
| 7,359,186 B2 * | 4/2008 | Honda et al. | 361/685 |
| 2003/0030990 A1 * | 2/2003 | King et al. | 361/724 |
| 2003/0040836 A1 | 2/2003 | Deckers | |
| 2003/0049105 A1 * | 3/2003 | Mueller et al. | 414/277 |
| 2003/0076618 A1 | 4/2003 | Brace et al. | |
| 2004/0105187 A1 | 6/2004 | Woodruff et al. | |
| 2004/0181388 A1 | 9/2004 | Yip et al. | |
| 2004/0223253 A1 | 11/2004 | Woodruff et al. | |
| 2004/0264037 A1 | 12/2004 | Downey et al. | |
| 2004/0264038 A1 | 12/2004 | Heineman et al. | |
| 2004/0264039 A1 | 12/2004 | Armagost et al. | |
| 2004/0264040 A1 | 12/2004 | Armagost et al. | |
| 2004/0264041 A1 | 12/2004 | Kumpon et al. | |
| 2004/0264042 A1 | 12/2004 | Pollard et al. | |
| 2005/0007692 A1 | 1/2005 | Thompson et al. | |
| 2005/0047258 A1 | 3/2005 | Starr et al. | |
| 2005/0063089 A1 | 3/2005 | Starr et al. | |
| 2005/0065637 A1 | 3/2005 | Lantry et al. | |
| 2005/0195517 A1 | 9/2005 | Brace et al. | |
| 2005/0195518 A1 | 9/2005 | Starr et al. | |
| 2005/0195519 A1 | 9/2005 | Kumpon et al. | |
| 2005/0195520 A1 | 9/2005 | Starr et al. | |
| 2005/0219964 A1 | 10/2005 | Pollard et al. | |
| 2005/0246484 A1 | 11/2005 | Lantry et al. | |
| 2005/0267627 A1 | 12/2005 | Lantry et al. | |
| 2006/0002093 A1 * | 1/2006 | Carlson et al. | 361/726 |
| 2006/0048001 A1 * | 3/2006 | Honda et al. | 714/7 |
| 2006/0061955 A1 | 3/2006 | Imblum | |
| 2006/0064953 A1 | 3/2006 | Wong | |
| 2006/0070059 A1 | 3/2006 | Starr et al. | |
| 2006/0095657 A1 | 5/2006 | Rector et al. | |
| 2006/0112138 A1 | 5/2006 | Fenske et al. | |
| 2006/0126209 A1 | 6/2006 | Starr et al. | |
| 2006/0134997 A1 | 6/2006 | Curtis et al. | |
| 2006/0161936 A1 | 7/2006 | Permut et al. | |
| 2006/0164928 A1 | 7/2006 | Starr et al. | |
| 2006/0215300 A1 | 9/2006 | Starr et al. | |
| 2007/0053169 A1 * | 3/2007 | Carlson et al. | 361/727 |

FOREIGN PATENT DOCUMENTS

| | | |
|---|---|---|
| JP | 10042493 A2 | 2/1998 |
| JP | 2001326479 A2 | 5/2000 |
| WO | WO 2005/010661 A2 | 2/2005 |
| WO | 2005/045168 | 12/2005 |
| WO | 2005/046447 | 12/2005 |

OTHER PUBLICATIONS

U.S. Appl. No. 11/145,768, Downey et al.
U.S. Appl. No. 11/230,146, Starr et al.
U.S. Appl. No. 11/240,893, Starr et al.
U.S. Appl. No. 11/264,920, Lantry et al.

* cited by examiner

HIGH DENSITY ARRAY SYSTEM HAVING MULTIPLE STORAGE UNITS WITH ACTIVE MOVABLE MEDIA DRAWERS

CROSS-REFERENCE TO ELATED APPLICATIONS

This application is a Non-Provisional Application based on U.S. provisional Ser. No. 60/788,487, entitled HIGH DENSITY ARRAY SYSTEM WITH ACTIVE STORAGE BLADES, filed Mar. 31, 2006 which is incorporated herein by reference.

FIELD OF THE INVENTION

The present invention is directed to a storage system having a plurality of storage units, the storage system is useful in storing data to any one of a plurality Of storage elements associated with at least one of the storage units, each storage element is associated with a retractable media drawer that can be moved at least partially out of the storage unit without power and communication interruption to the storage elements.

BACKGROUND OF THE INVENTION

Presently, data storage units, such as mass data storage libraries and RAID (Redundant Array of Independent Disks/Drives) systems, each employing multiple storage elements, are primarily used to archive data, i.e., store data that is not immediately needed by the host computer, and provide archived data to the host computer when the data is needed. To elaborate, a typical data storage unit receives data from a host computer and causes the data to be stored or recorded on a recording medium typically located in one or more of the storage elements, such as a disk drive for example. When the host computer requires some of the data that was previously stored in the storage elements, a request for the data is sent from the host computer to the data storage unit to fulfill real-time data retrieval needs. In response, the data storage unit retrieves the data from the storage elements, and transmits the retrieved data to the host computer system.

From time to time, there may be reason to remove one or more storage elements from a data storage unit, such as for repair, maintenance or upgrades. This generally results in removing panels associated with a data storage unit cover in order to access the storage elements inside the data storage unit. Typically, the process of removing one or more storage elements from a data storage unit further requires turning off the power to the data storage unit.

In an effort to improve accessing powered storage elements operable with a data storage unit both methods and apparatus are disclosed herein. It is to innovations related to this subject matter that the claimed invention is generally directed.

SUMMARY OF THE INVENTION

The present invention relates generally to a storage system that is useful in storing data to any one of a plurality of storage units, at least one of the plurality of storage units may have a plurality of storage elements supported by a drawer like structure that can be moved at least partially out of one of the storage units without power and communication interruption to the storage elements.

Embodiment of the present invention can therefore comprise a primary data storage unit comprising: a power source; at least one server mother board; at least one expander device connected to a second data storage unit; a plurality of retractable media drawers wherein each of the retractable media drawers comprise a plurality of data storage elements, each of the retractable media drawers maintaining connectivity to the power source, the at least one server mother board and the at least one expander device when each of the media drawers is between a first position that is extended partially away from the primary data storage unit and a second position that is at least partially retracted from the first position towards the primary data storage unit.

Another embodiment of the present invention can therefore comprise a primary data storage unit comprising: a power source; at least one server mother board; at least one expander device connected to a second data storage unit; a plurality of retractable media drawers wherein each of the retractable media drawers comprise a plurality of data storage elements, each of the retractable media drawers maintaining connectivity to the power source, the at least one server mother board and the at least one expander device when each of the media drawers is between a first position that is extended partially away from the primary data storage unit and a second position that is at least partially retracted from the first position towards the primary data storage unit.

Yet another embodiment of the present invention can therefore comprise a primary data storage unit comprising: a power source; at least one server mother board; at least one expander device connected to a second data storage unit; a plurality of retractable media drawers wherein each of the retractable media drawers comprise a plurality of data storage elements, each of the retractable media drawers maintaining connectivity to the power source, the at least one server mother board and the at least one expander device when each of the media drawers is between a first position that is extended partially away from the primary data storage unit and a second position that is at least partially retracted from the first position towards the primary data storage unit.

DETAILED DESCRIPTION

Figure 1A:
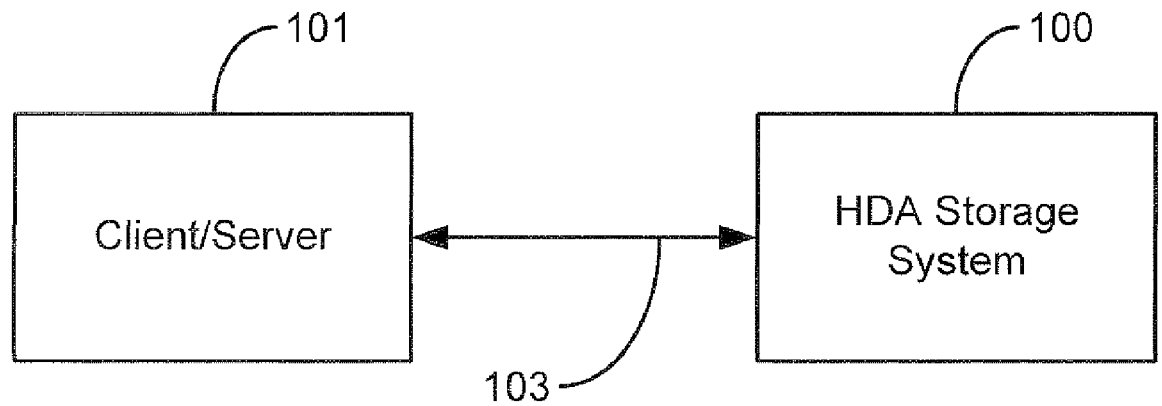
FIG. 1A is a block diagram of a data storage arrangement constructed in accordance with an embodiment of the present invention.

Referring to the drawings in general, and more specifically to FIG. 11A, shown therein is a block diagram of a data storage arrangement constructed in accordance with an embodiment of the present invention. In what follows, similar or identical structure is identified using identical callouts.

The data storage arrangement illustrated in FIG. 1A can comprise a client/server 101 in communication 103 (i.e. linked) with a High Density Array (HDA) data storage system 100. The client/server 101 can be a host computer or some other consumer/producer of data; other embodiments can also include another storage library or a streaming output device, such as a video server, to name several examples. The client 101 is an entity, or entities, that is capable of 'taking in' data, for example a client/server 101 is a consumer when receiving data and an HDA 100 is a consumer when receiving data. As one skilled in the art will appreciate, in addition to 'taking in' data, a consumer of data is also generally capable of manipulating and/or transmitting data. The client 101 can be a personal computer, a main frame computer, a server, or any computer system operatively linked to the HDA 100, to name a few examples. The communication path 103, at a minimum, needs only to facilitate communication between the client/server 101 and the HDA 100. The means for communication can be accomplished by a dedicated pathway (such as a SCSI [Small Computer Systems Interface] cabled connection), fiber-channel or, in an alternative embodiment, a pathway over a network (such as a LAN, WAN, or other communication architecture), for example. Furthermore, the communication path can be in the form of (not to be limited by) a wire line pathway, wireless, fiber channel or a combination thereof.

Figure 1B:
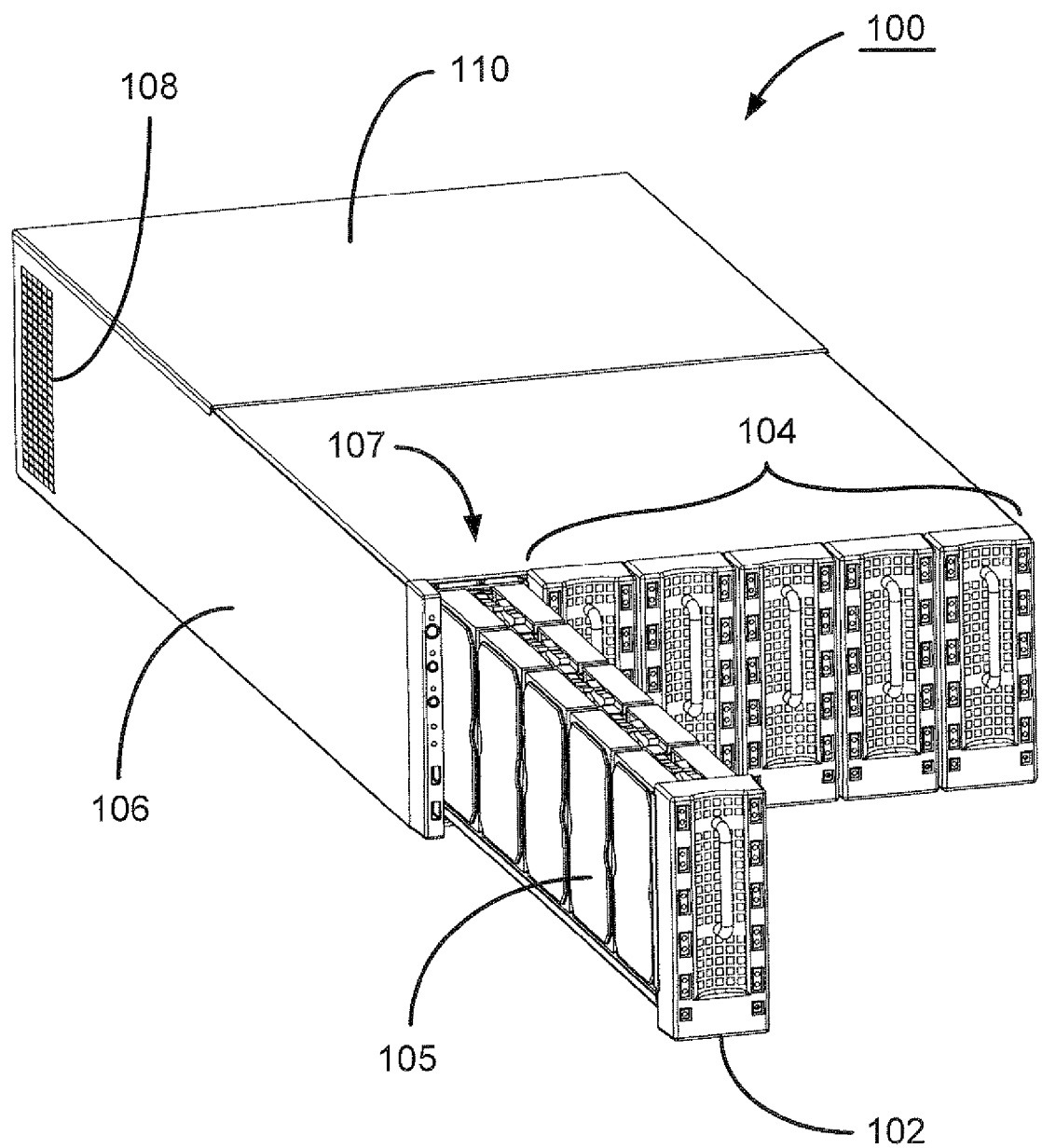
FIG. 1B shows a commercial embodiment of a High Density Array (HDA) unit consistent with embodiments of the present invention.

Embodiments of the present invention can be commercially practiced in a Spectra Logic HDA manufactured by Spectra Logic of Boulder Colo. FIG. 1B shows a commercial embodiment of one HDA unit 100 with a first retractable media drawer 102, comprising ten disk drives 105, in an extended position and five additional retractable media drawers 104, each capable of comprising ten disk drives 105, or less, in a fully retracted position. A retracted position is when a media drawer 104 is substantially in the interior space of the HDA unit 100 and extended position can be wherein a media drawer, such as the media drawer 102, is less than substantially in the interior space of the HDA unit 100. In the illustrative embodiment shown here, the media drawer 102 is moved partially out from the interior space of the HDA unit 100 through an accommodating opening 107 that cooperates with the media drawer 102 such that the media drawer 102 is moveable (i.e., the ability to be moved) in a drawer like motion. The media drawer 102 is shown guided through the opening 107 to extend from the HDA unit 100 in a linear direction. The opening is tailored for the movement of the media drawers, such as the media drawer 104. A media drawer 104 can be optimized for load balancing, power balancing, capacity balancing, etc. Power and communication can be provided to the retractable media drawers 102 and 104 via an electrical power source and communication source which can be disposed in the HDA unit 100 without interruption regardless of whether the retractable media drawers 102 and 104 are in a retracted position, extended position, or a position therebetween. In other words, the retractable media drawer 104 can be in a powered state independent of the location of the drawer 104 by maintaining connectivity to at least the power supply (not shown) disposed in the unit 100 and in an alternative embodiment, maintaining connectivity to a communication source (not shown) also associated with or transmitting through the storage unit 100. Also, the communication link with a media drawer, such as drawer 102, can be accomplished with a wire line, fiber optic cable, or wirelessly such as by infra-red, radio frequency or other type of wireless transmission. Each drawer 102 and 104 can be configured to store data with back-up capabilities such as in a RAID (Redundant Array of Inexpensive Disk [drives]) configuration, for example RAID level-5 or RAID level-6, or without redundancy. In an alternative embodiment, back-up configurations can be accomplished by writing redundant data across different drawers 102 and 104 or across multiple HDA units that are interconnected. As one skilled in the art will appreciate, there are numerous RAID configurations which are optimized to an end user's desire to balance storage speed performance with redundancy of data. The HDA unit 100 is substantially encased on four sides (top, bottom, left side and right side) by a cover 106 and a removable panel 110 which define an interior space of the HDA unit 100. A vent 108 is provided in the cover 106 for cooling purposes which, as known by a skilled artisan, is not limited by quantity, size or location.

Figure 1C:
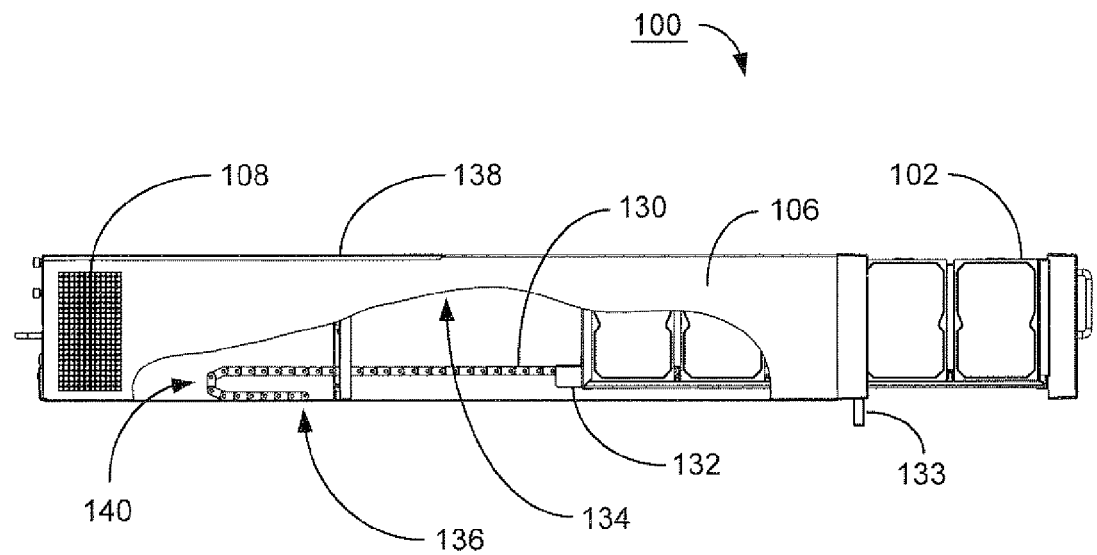
FIG. 1C is a side view of the HDA unit illustrating one embodiment of a means to provide uninterrupted power and communication to a retractable media drawer when the retractable media drawer is moved between a retracted and extended position.

FIG. 1C is a side view of the HDA unit 100 illustrating one embodiment of a means to provide uninterrupted power and communication to a retractable media drawer 102 when the retractable media drawer 102 is moved between a retracted and extended position. As revealed through the cutaway 134 in the cover 106, power and communication are provided to the retractable media drawer 102 from the HDA unit 100 via motion accommodating conductor apparatus, which in this illustrative embodiment is a flex cable (not shown) supported by a flex chain linkage 130 (or other equivalent flexible cable carrier that prevents tangling of the flexible cable, i.e. is tangle inhibiting), such as an IGUS chain from IGUS Corporation of Koln, Germany, that connects to the HDA unit 100 at a back plane connector 136 and the retractable media drawer 102 at a drawer connector apparatus 132. Alternatives to a flex cable can include a flexible ribbon cable or flexible individual or semi-individual group of wires (such as one or more ipass cables provided by Molex Corporation of San Jose, Calif.) just to name several examples that can accomplish the same functionality without deviating from the present invention. The flex cable linkage 130 tracks the movement of the retractable media drawer 102 providing uninterrupted power and communication from a retracted position to an extended position without binding or tangling, as shown by the pivoting links to form a bend 140 in the linkage 130. In one embodiment, a drawer latch mechanism 133, such as a Richco R1001 card inserter/extractor, of Richco Inc., of Morton Groove, Ill., can be provided to limit the extension of the retractable media drawer 102 thus retaining a portion of the drawer 102 in the HDA unit 100 for stability and support when in the extended position (for an operator to access the disk drives 105, or an alternative data storage device, associated with the drawer 102). The drawer latch mechanism 133 can be manipulated to unlatch the retractable media drawer 102 allowing removal of the drawer 102 from the HDA unit 100.

Figure 1D:
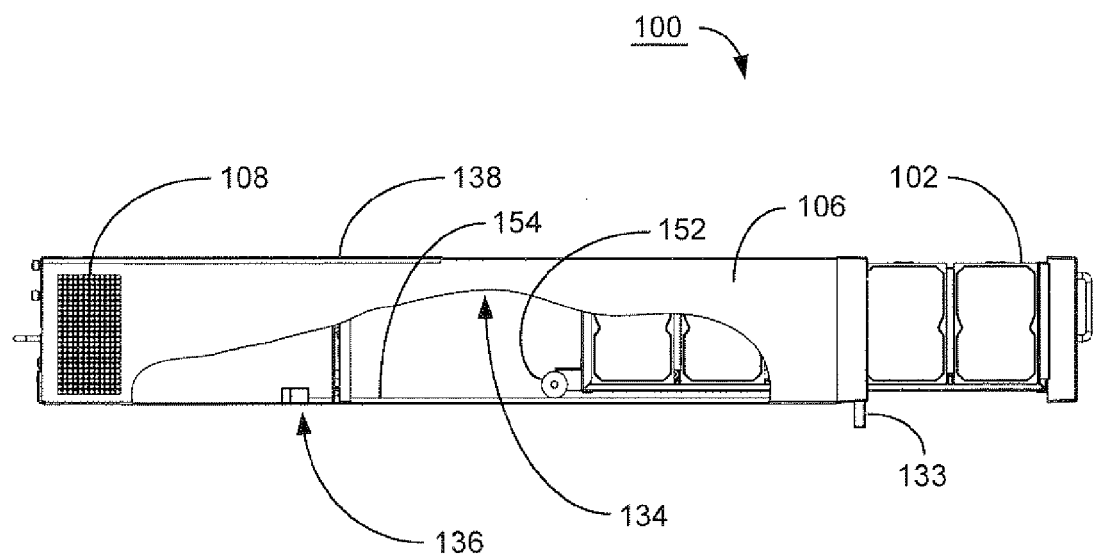
FIG. 1D is a side view of the HDA unit illustrating an alternative embodiment of a means to provide uninterrupted power and communication to a retractable media drawer when the retractable media drawer is moved between a retracted and extended position.

FIG. 1D is a side view of the HDA unit 100 illustrating an alternative embodiment of a means to provide uninterrupted power and communication to a retractable media drawer 102 when the retractable media drawer 102 is moved between a retracted and extended position. As revealed through the cutaway 134 in the cover 106, power and communication are provided to the retractable media drawer 102 via a conductive wheel 152 (or optionally a brush system) that is in contact with a conductive path 154 connected to a back plane connector 136, for example. As the retractable media drawer 102 is moved between a retracted position and a fully extended position, the conductive wheel 152 can continuously provide power and communication to the drawer 102 while in contact with the conductive path 154. Optionally, the conductive wheel 152 and conductive path 154 can provide only power with data transmitted wirelessly. The drawer latch mechanism 133, as previously described, can serve the purpose of retaining the retractable media drawer 102 partially in the HDA unit 100 unless made to disengage the drawer 102 from the unit 100.

Figure 1E:
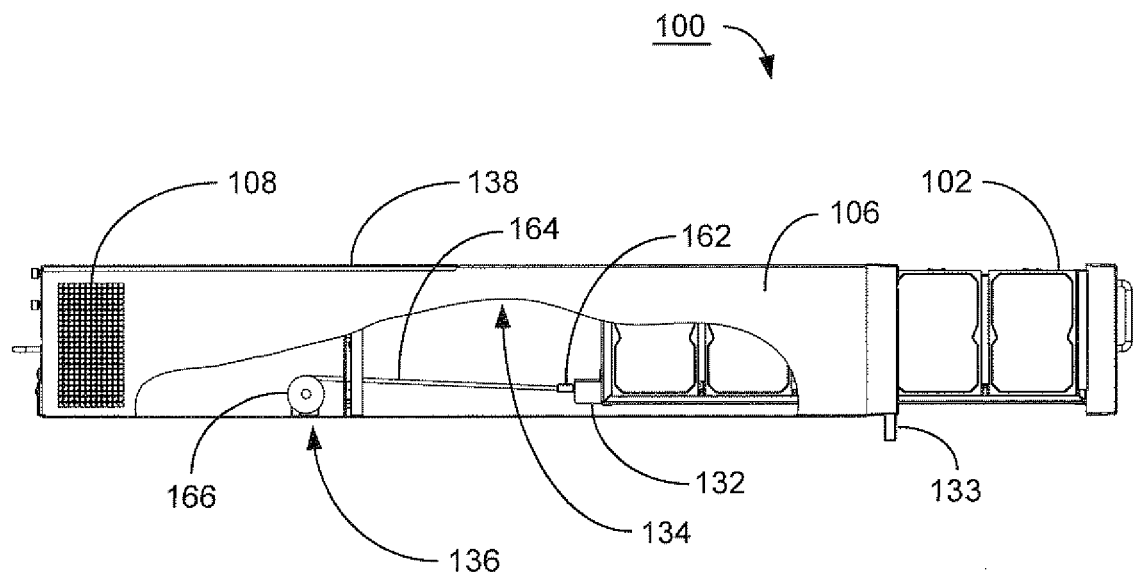
FIG. 1E is a side view of the HDA unit illustrating yet another alternative embodiment of a means to provide uninterrupted power and communication to a retractable media drawer when the retractable media drawer is moved between a retracted and extended position.

FIG. 1E is a side view of the HDA unit 100 illustrating yet another embodiment of a means to provide uninterrupted power and communication to a retractable media drawer 102 when the retractable media drawer 102 is moved between a retracted and extended position. As revealed through the cutaway 134 in the cover 106, power and communication are provided to the retractable media drawer 102 via a flex cable 164 that connects to the HDA unit 100 at a back plane connector 136 and the retractable media drawer 102 at a drawer connector 132. In this embodiment, the flex cable 164 maintains tension via a spring-loaded spindle 166, in order to prevent binding or tangling. As one skilled in the art will appreciate, FIGS. 1B, 1C and 1D are illustrative of the many optional ways to provide uninterrupted power and communication to a retractable media drawer 102 when moved between a retracted and extended position.

Figure 2A:
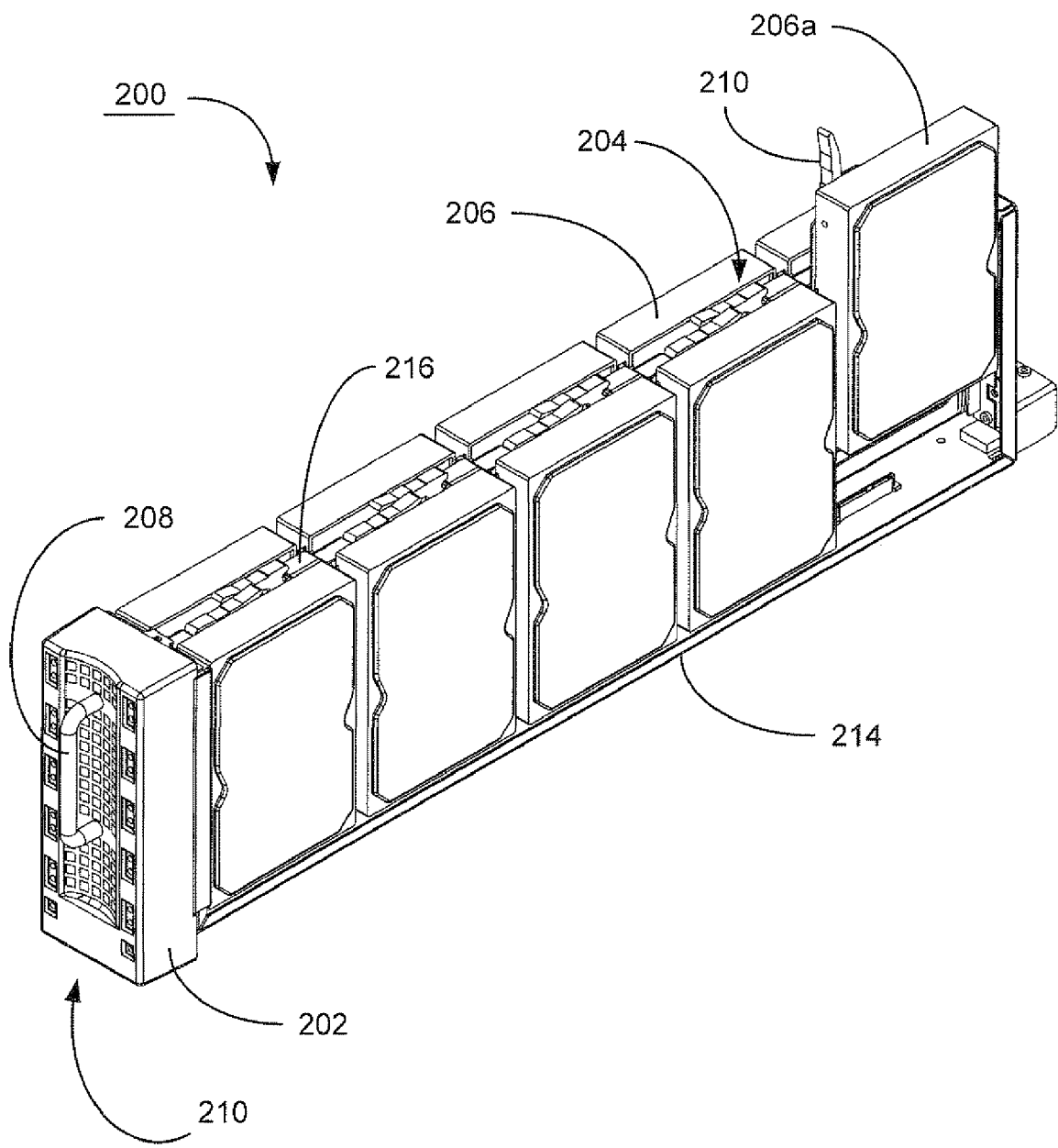
FIG. 2A is one commercial configuration of a retractable media drawer populated with ten disk drives consistent with embodiments of the present invention.

With reference to FIG. 2A, shown therein is one commercial configuration of a retractable media drawer 200 populated with ten 3.5 inch form factor disk drives 206, such as a Barracuda class disk drive manufactured by Seagate Corporation of Scotts Valley, Calif. In an alternative embodiment, the retractable media drawer 200 can accommodate different form factor drives, such as 2.5 inch disk drive and 3.5 inch disk drive for example. Optionally, the storage drawer 200 may be limited to accommodating a specific form factor disk drive or alternate kind of medium, such as flash memory cards, or a combination therein, for example. In yet another alternative embodiment, the storage drawer 200 may comprise disk drives with different storage capacities (wherein, in one embodiment, the lowest capacity drive may be the determining capacity of all other drives on the drawer 200) and storage speeds. In addition to the disk drives 206, one embodiment of the retractable media drawer 200 can comprises a bezel module 202 with a handle 208 at a front end 210, a drawer plate 214 which supports a drawer plate board (not shown) for providing power to the disk drives 206 and a mid-plane frame 216 shown interposed between the drives 206 which can cooperate with retaining mechanisms 204 wherein a retaining mechanism 204 can further comprise a latch 210 for locking and unlocking (removably locking) a drive 206 in place. As illustrated, a disk drive 206a is partially ejected from the drawer plate 214. In this embodiment, the disk drives 206 are oppositely disposed relative the mid-plane frame 216 providing the added advantage of oppositely rotating disks (not shown) comprised by the disk drives 206 reducing the vibration of the retractable media drawer 200 when fully populated. Additional vibration control means can be provided, such as dampeners and wedge shaped locking mechanisms associated with the drawer 200, just to name a couple of examples.

Figure 2B:
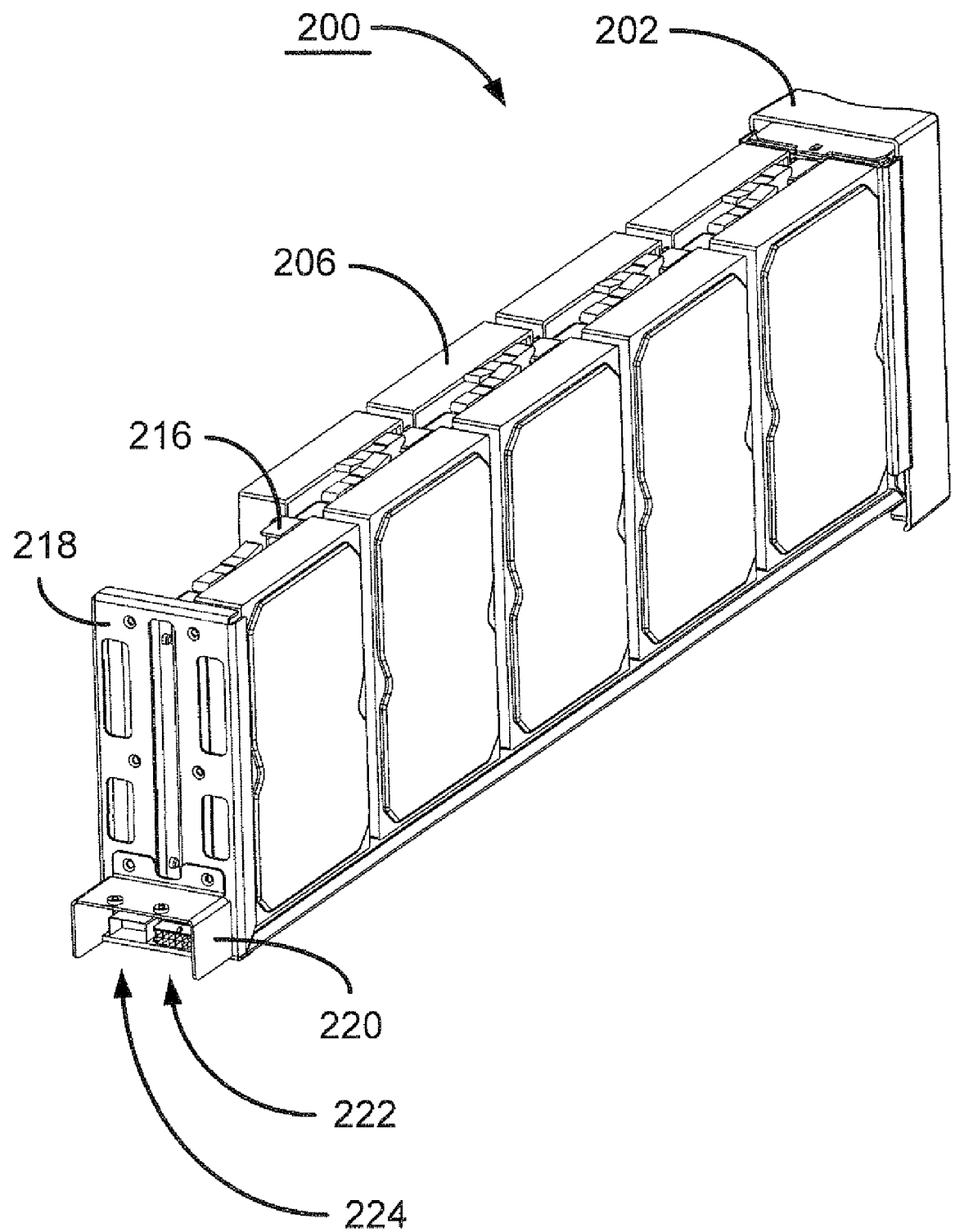
FIG. 2B shows a back view of the retractable media drawer populated with nine disk drives consistent with embodiments of the present invention.

FIG. 2B shows a back view of the retractable media drawer 200 wherein the retractable media drawer 200 is populated with nine disk drives 206. The retractable media drawer 200 receives and transmits data over a drawer SAS (Serial Attached SCSI) connector 224 receives power over a drawer power connector 222. As a skilled artisan will appreciate, a variety of connector types and configurations can be used to accomplish the same functionality. A rear drawer plate 218 provides support for a connector shroud 220 which not only protects the connectors 222 and 224 but provides a mounting location for an uninterruptible power and communication system, such as flex cable linkage 130.

Figure 2C:
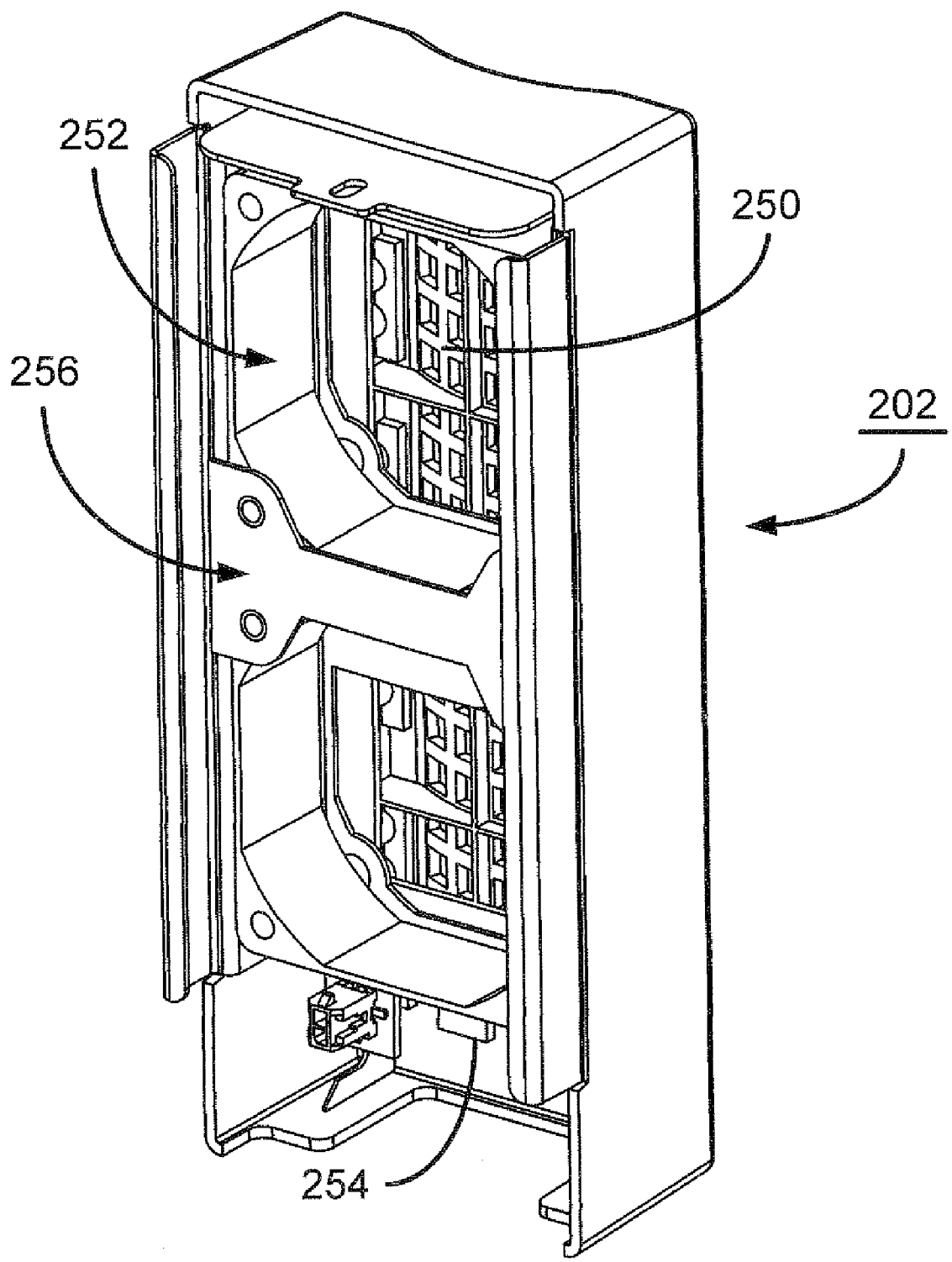
FIG. 2C shows the back side of a bezel module consistent with embodiments of the present invention.

FIG. 2C shows the back side 256 of the bezel module 202. The bezel module 202, in one embodiment of the present invention, is adapted for easy replacement should a failure occur. Herein, the bezel module 202 can accommodate two fans (not shown) in two bezel fan housings 252 and 254 that can pull air through vents 250 in the face of the bezel module 202 for cooling the disk drives 206. Power is provided to the bezel module 202 via a connector 254. In one embodiment, a locking feature (not shown) can optionally be used with the bezel module 202 for rapid access.

Figure 2D:
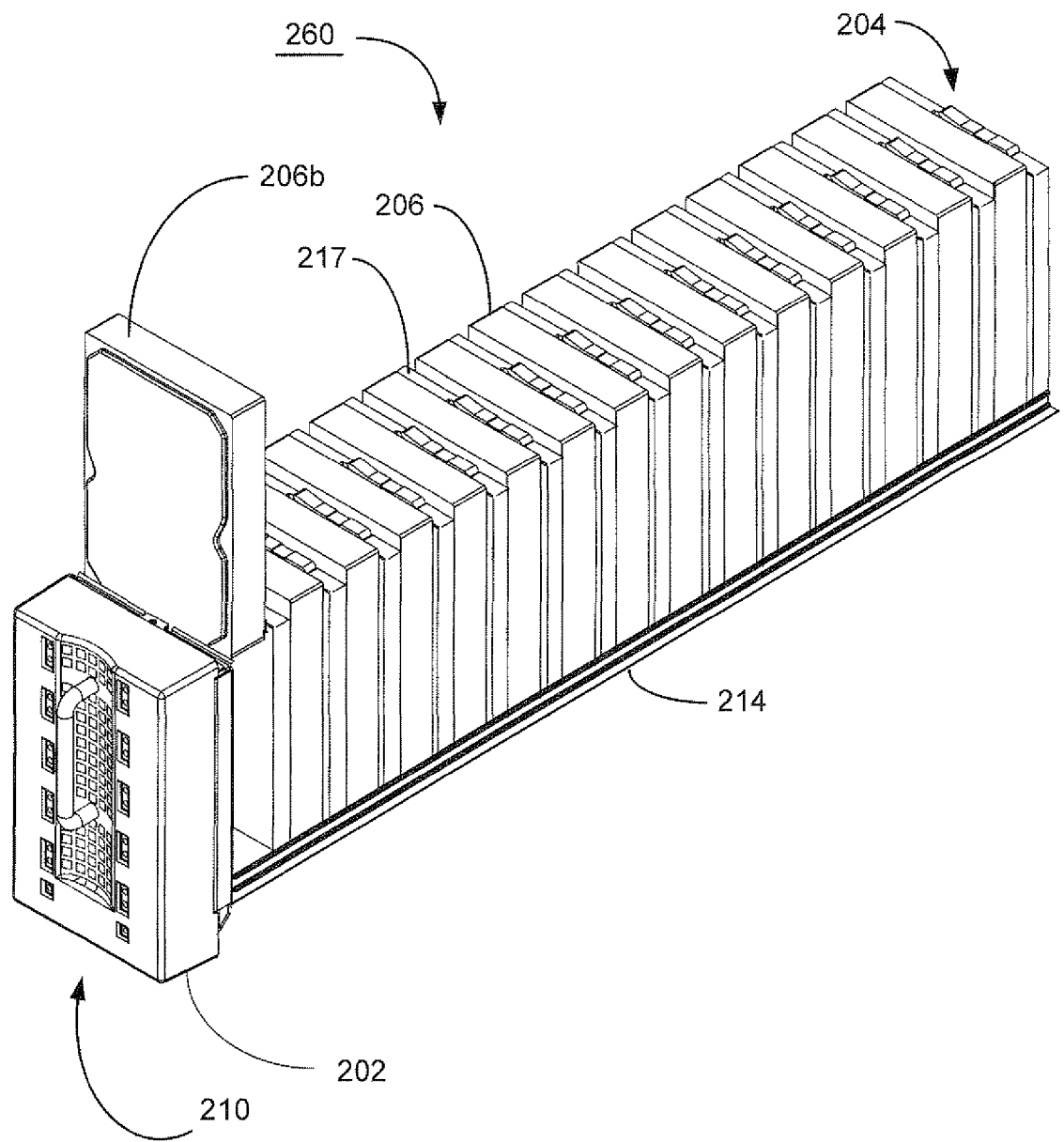
FIG. 2D shows an alternative embodiment of a retractable media drawer consistent with embodiments of the present invention.

FIG. 2D is an alternative embodiment of a retractable media drawer. As illustratively shown, the retractable media drawer 260 is adapted to support a plurality of disc drives 206 arranged vertically facing the bezel module 202. The retractable media drawer 260 comprises support retaining mechanisms 204 for holding the disc drives 206 in place. As illustratively shown, a disc drive 206b can be removed from the retractable media drawer 260 by a release mechanism associated with the support retaining mechanism 204. In one embodiment, the disc drives 206 can be in operation while the disc dive 206b is removed and optionally be replaced by another disc drive, called a "hot-swapping". As previously discussed, the retractable media drawer 260 can support one or more disc drives 206 and be moved in and out of a storage system, such as the HDA unit 100, without interruption of power and communication. In an alternative embodiment, the retractable media drawer 260 can comprise side walls (not shown) to form an embodiment of a storage media drawer.

Figure 2E:
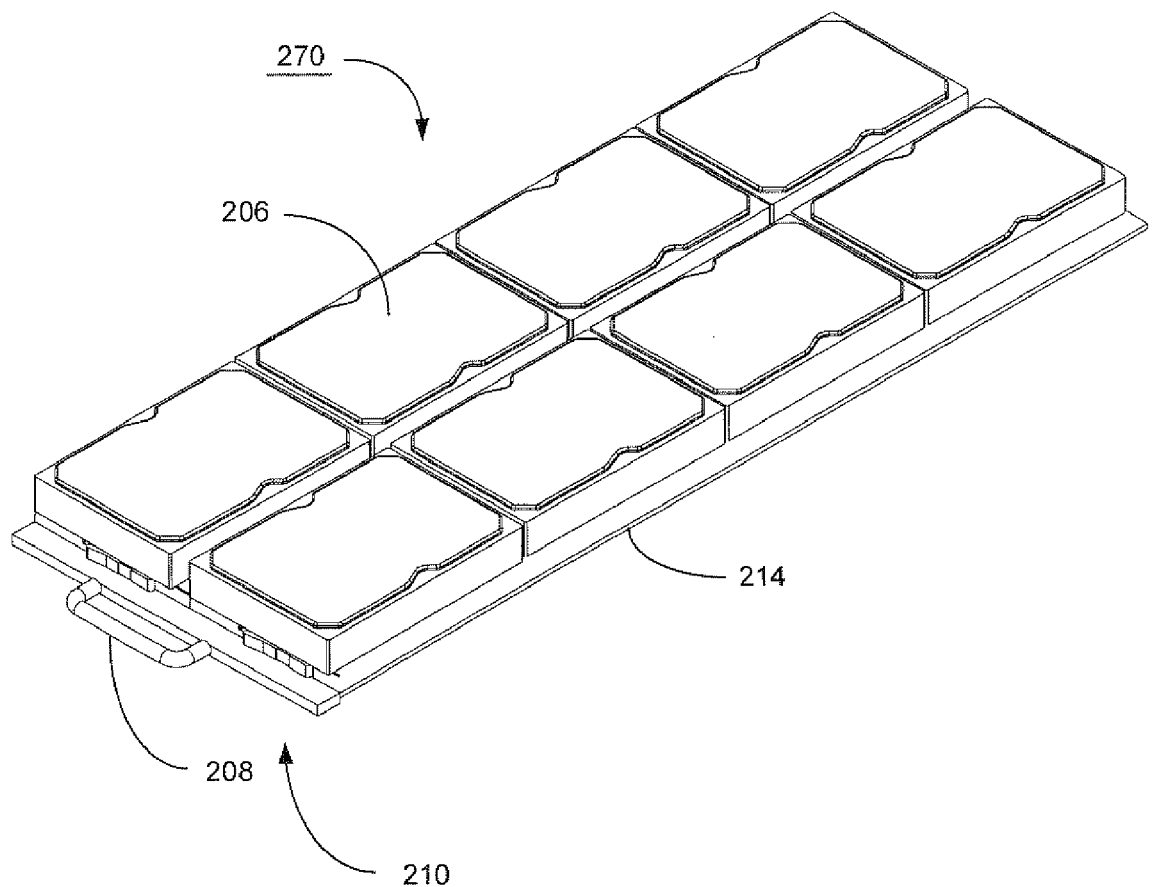
FIG. 2E shows another alternative embodiment of a retractable media drawer consistent with embodiments of the present invention.

FIG. 2E is another alternative embodiment of a retractable media drawer. As illustratively shown, the retractable media drawer 270 is adapted to support a plurality of disc drives 206 arranged horizontally along the drawer plate 214 to form a storage media plate. In this embodiment, the retractable media drawer 270 can be pulled out by a handle 208 located at the front 210 of the structure 270. The retractable media drawer 270 can be stacked, i.e., stackable, with other like support structures as well as having other like retractable media drawers to the left and/or right of the structure 270.

Figure 2F:
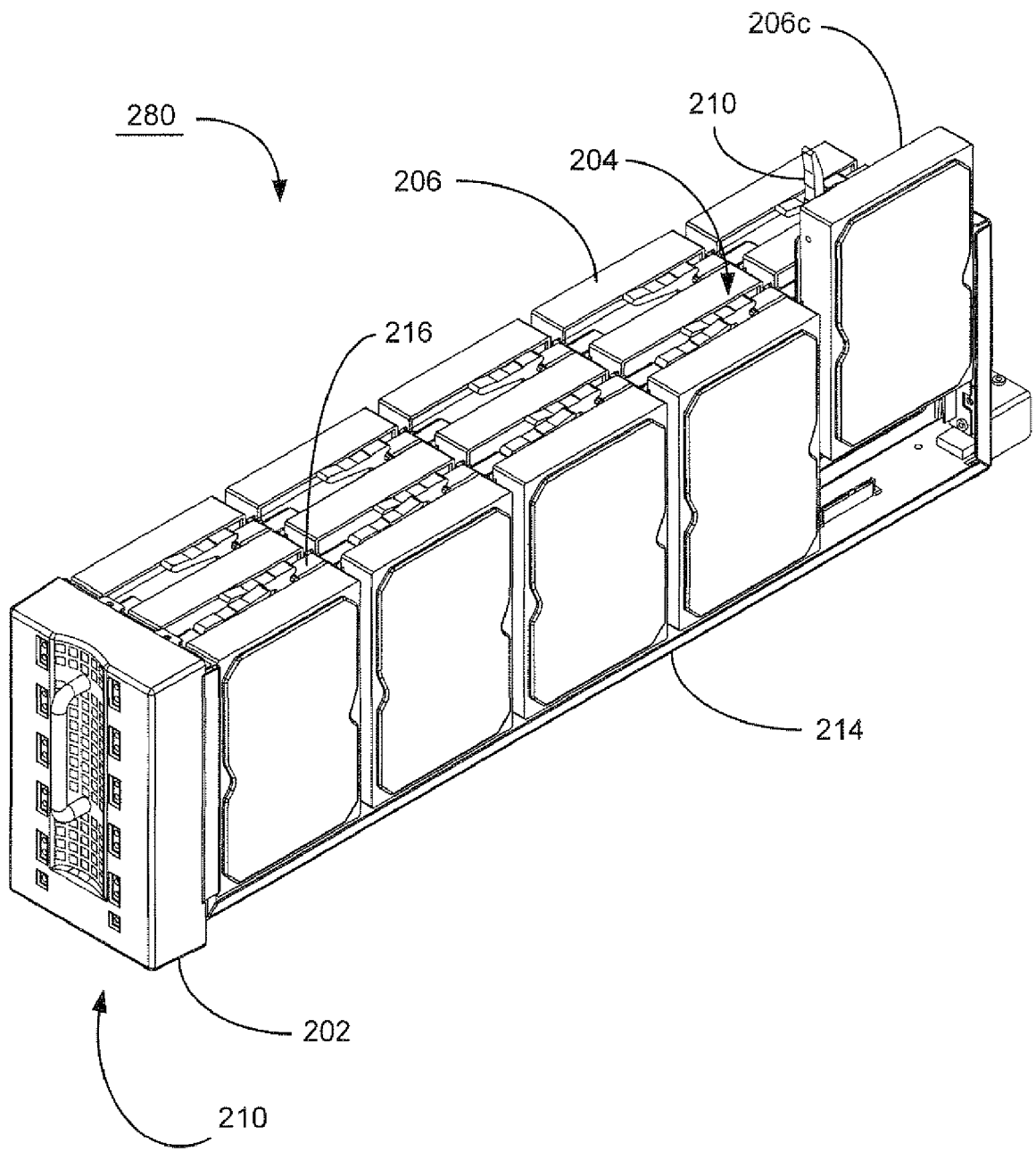
FIG. 2F shows yet another alternative embodiment of a retractable media drawer consistent with embodiments of the present invention.

FIG. 2F is yet another alternative embodiment of a retractable media drawer. As illustratively shown, the retractable media drawer 270 is adapted to support a plurality of disc drives 206 arranged in as in the storage drawer 200 in a row of three to form a double media drawer. It will be appreciated by one skilled in the art that multiple rows can exist in the storage drawer 280. It will further be appreciated by one skilled in the art that alternative media drawers, or retractable media drawers, can be used while still maintaining substantially the same functionality without departing from the scope and spirit of the present invention.

Figure 3:
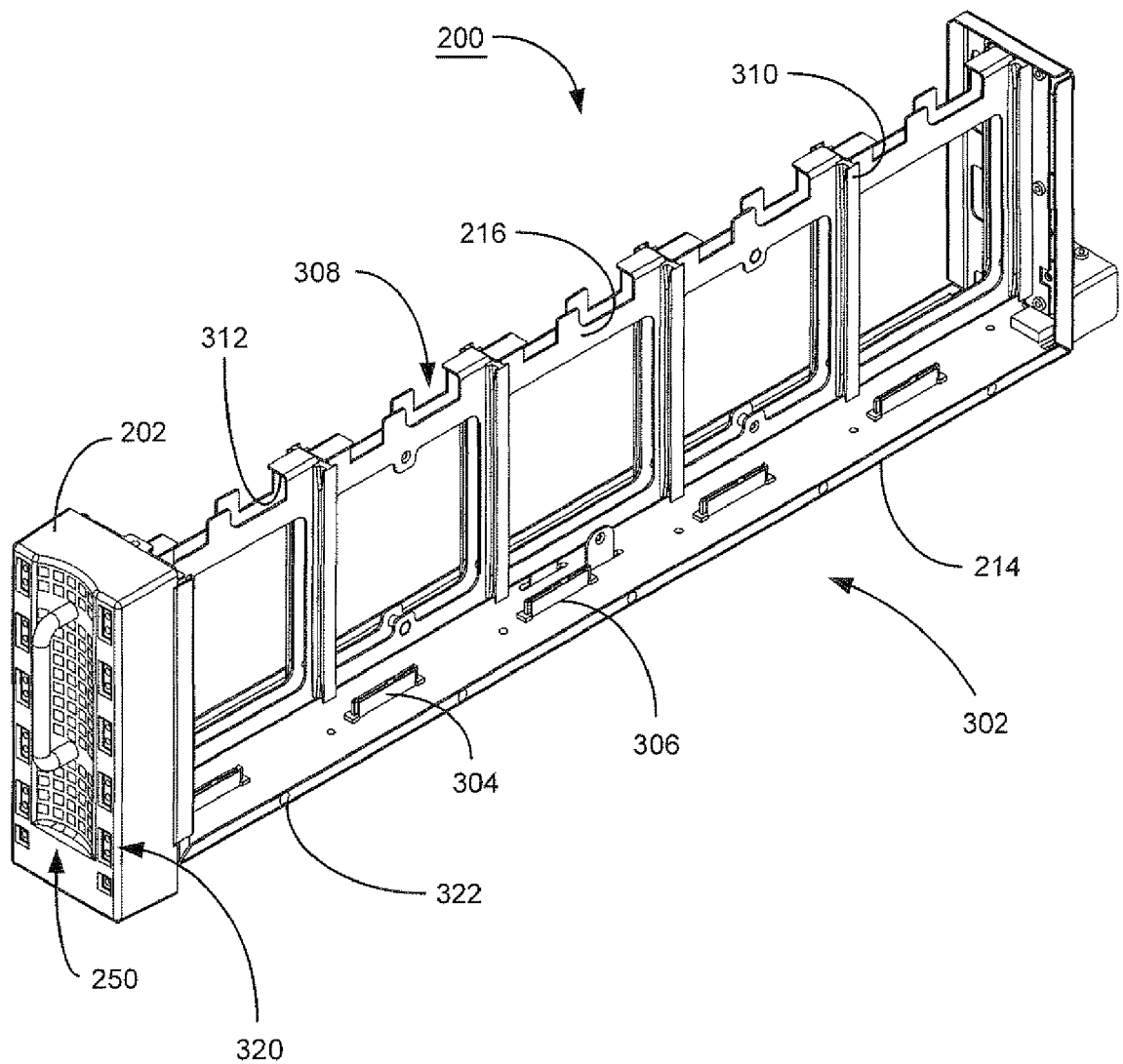
FIG. 3 shows the retractable media drawer of FIG. 2A without disk drives consistent with embodiments of the present invention.

FIG. 3 shows the retractable media drawer 200 of FIG. 2A without disk drives 206. The HDA retractable media drawer 200 generally comprises a frame 302 that can accommodate a bezel module 202, a drawer plate 214 and a mid-plane frame 216 capable of supporting retaining mechanisms 204 in accommodating retaining mechanism locations 308. The drawer plate 214 comprises connector openings 306 such as for SAS (Serial Attached SCSI) connectors 304, or alternative data connectors such as Serial ATA connectors for example, integrated with a drawer plate board (not shown) attached to the underside of the drawer plate 214. Disk drives 206 are adapted to plug into the SAS connectors 304 in a male/female relationship for linking to power and communication. The drawer plate 214 can, optionally, comprise base plate indication lights 322, such as LEDs (Light Emitting Diode) or terminations of light pipes, that in the illustrative embodiment are in proximity to the disk drives 206. In one embodiment the indication lights 322 can be connected to the bezel indication lights 320 located on the face of the bezel module 202. The indication lights 320 and 322 indicate activity and functionality of any particular disk drive 206. The indication lights 320 and 322 indicate functional status such as on, off, rest mode, malfunctioning, unresponsive, etc. The base plate indication lights 322 can provide drive 206 location, for use by an operator for example, to the coinciding bezel indication light 320 when the drawer 200 is in at least an extended position. As is appreciated by one skilled in the art, the drawer 200 is not limited to SAS connectors 304 rather a variety of alternate connector configurations can be substituted without deviating from the functionality of the present invention.

Figure 4:
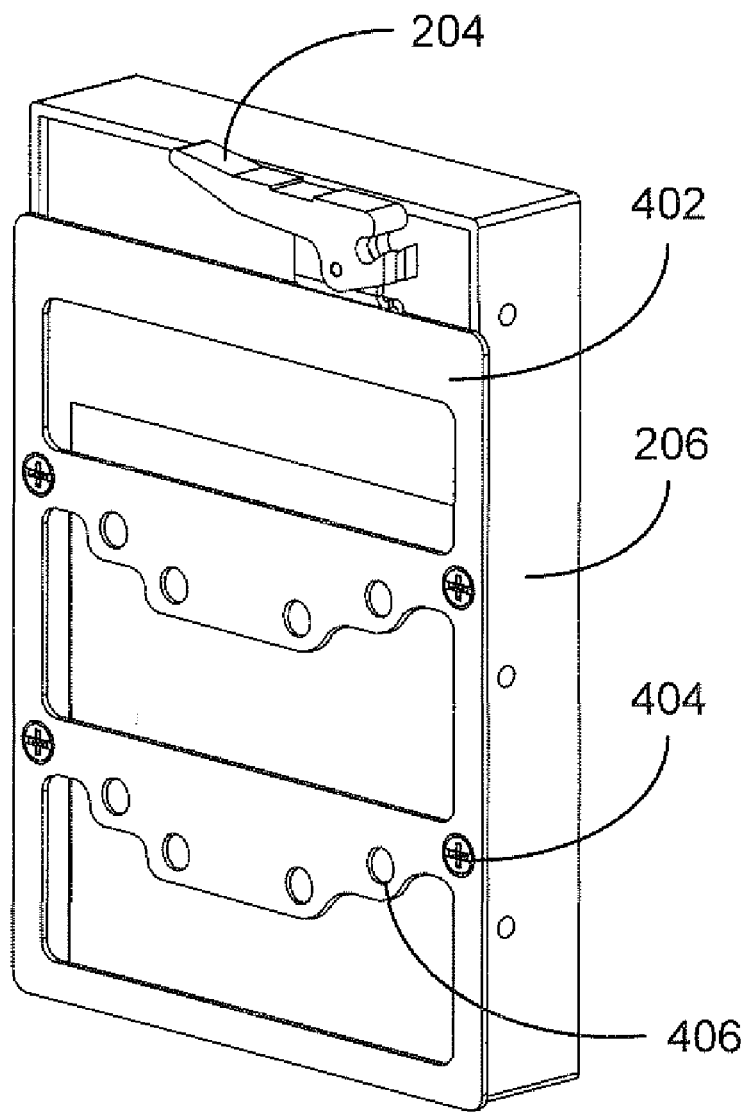
FIG. 4 shows an embodiment consistent with the present invention of a retaining mechanism of the illustrative commercial HDA embodiment in more detail.

FIG. 4 shows a retaining mechanism 204 of the illustrative commercial HDA embodiment in more detail. The retaining mechanism 204 is generally comprised of a latch 204 pivotally attached to a disk drive retaining plate 402. The retaining plate 402 is attached to the drive 206 by four screws 404 aligned with mounting holes (not shown) in the disk drive 206. The retaining plate 402 can be configured with additional mounting holes 406 to accommodate alternative form factor drives, such as 2.5 inch, or 1 inch mini drives for example. The latch 204 is adapted to cooperate with a retaining structure 312 shown in the frame 200 of FIG. 3. The retaining plate 402 is adapted to slideably engage accommodating retaining flanges 310 located at the mid-plane frame 216 of FIG. 3 whereby the disk drive is aligned to connect with a connector 304. A spring ejection mechanism, not shown, can also be used. As is appreciated by one skilled in the art, there are a number of alternative retaining and ejecting configurations that accomplish the same functionality.

Figure 5:
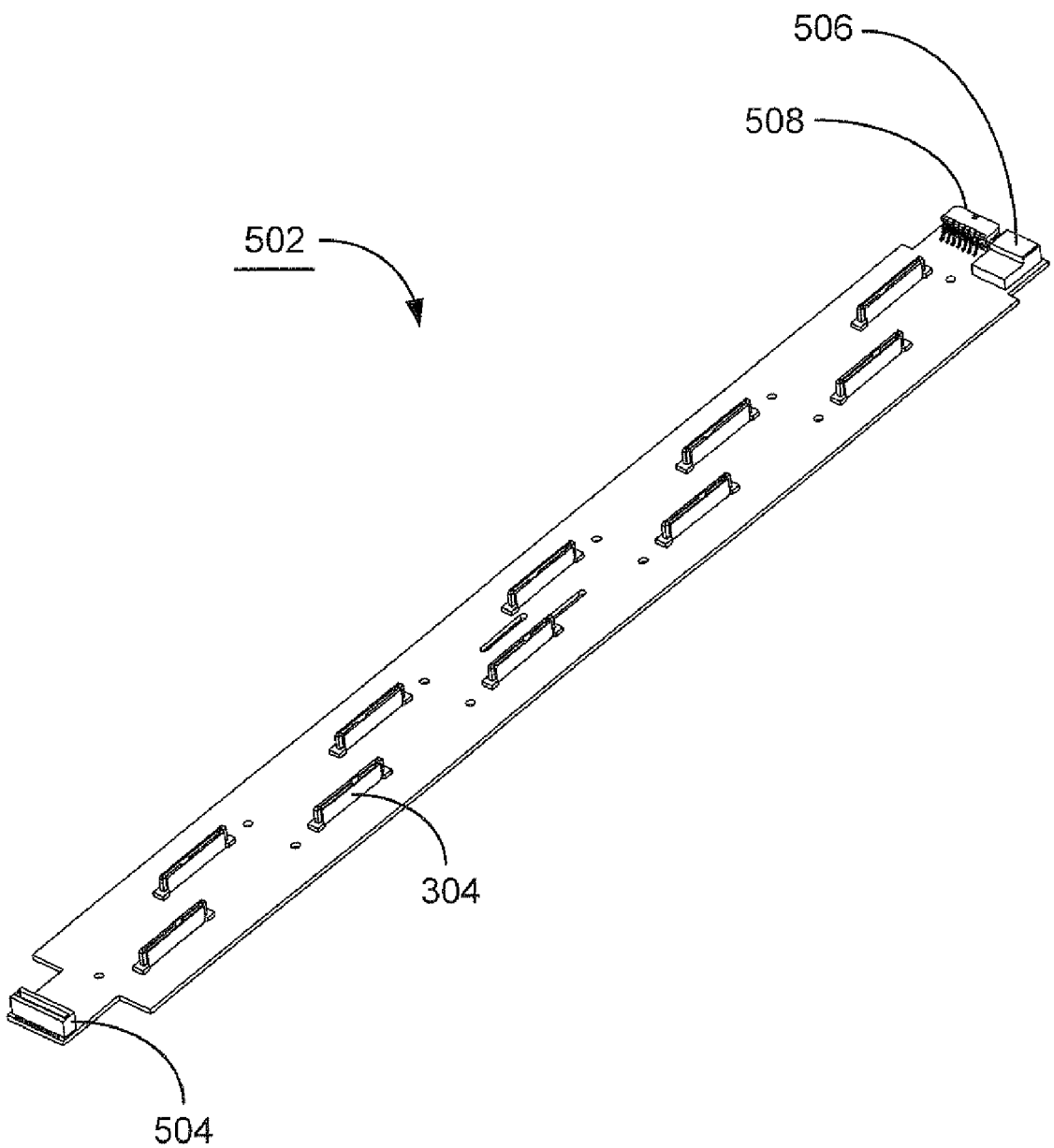
FIG. 5 shows an embodiment consistent with the present invention of a top view of a drawer plate board of the illustrative commercial HDA embodiment in more detail.

FIG. 5 shows a top view of the drawer plate board 502 of the illustrative commercial HDA embodiment in more detail. The drawer plate board 502 is a substrate adapted to support power and communication pathways such as electrical lines or traces or other conductive lines in addition to connector structures, such as SAS connectors 304, connected to the pathways that link the data storage elements to the drawer connector 132 connector structures. The drawer plate board 502 is substantially fixedly attached to the underside of the drawer plate 214 via screws in this example. The board provides for ten connectors 304, a bezel module connector 504, an in-band connector 506, for providing communication between a drive 206 (such as SAS communication) and a server (not shown) for example, and an out-of-band connector 508, for providing power and control components such as the bezel module 504, for example.

Figure 6:
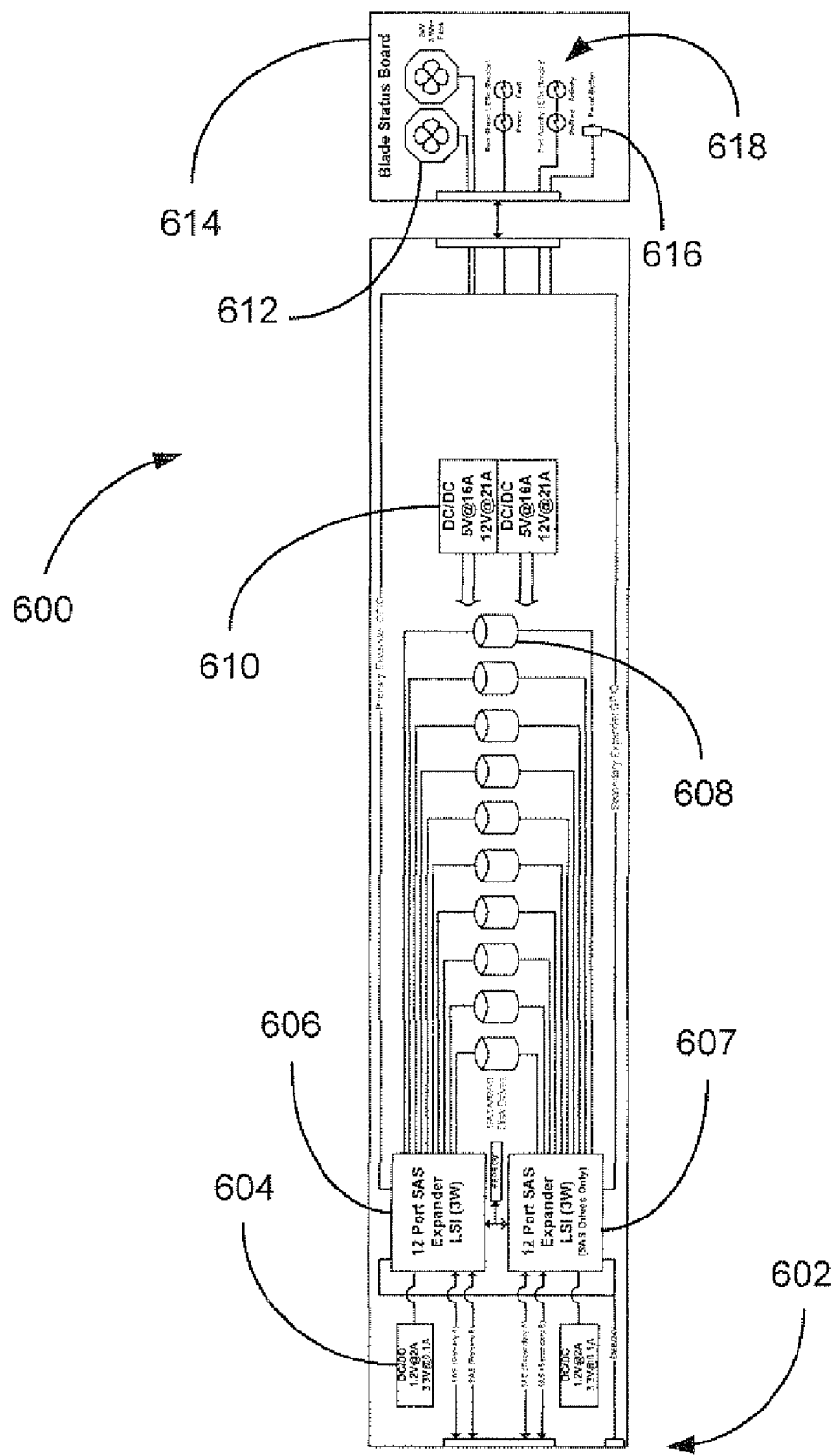
FIG. 6 shows an embodiment consistent with the present invention of an illustration of a drawer board schematic layout of the drawer plate board of FIG. 5.

FIG. 6 is an illustration of an embodiment of a drawer board schematic layout 600 of the drawer plate board 502 of FIG. 5 capable of being used with the retractable media drawer 200 of FIG. 2A. As illustrated, power and communication are received from the HDA unit 100 from the HDA connector end 602 of the board layout 600. In general, the board 502 provides a pathway between an initiator, such as a server, and a target, such as a disk drive 608 wherein communication may pass through one or more port expanders, or other routers, to complete a target path between the initiator and target. In this configuration, the board comprises two port expanders 606 and 607, such as an SAS X12A expander chip, or alternatively a X36 expander chip (just to name two examples) from LSI Logic of Milpitas, Calif., each capable of routing communication between a server, for example, and any of the ten drives 608 communicatively linked with the retractable media drawer 200. In this configuration, the retractable media drawer 200 only requires one primary port expander 606 with twelve ports to fully operate; however the back-up port expander 607 serves in a redundant port expander should the primary port expander 606 fail. In this configuration, a port expander 606 is a routing device which dedicates ten ports to the ten disk drives 608 and two ports communicate with two other devices, such as two servers or a server and another board or port expander, for example. One skilled in the art will appreciate that routing data can be accomplished with a variety of routing devices which are not limited to a port expander. Multiple drawer plate boards 502 can be interconnected via additional port expanders, such as port expanders 606 and 608, on other boards 502 which can serve a purpose to provide communication for multiple devices, such as multiple servers or other clients, for example. The board layout 600 is also shown to comprise two redundant 3.3V/1.2V power supply controllers 604 for the port expanders 606 and 607. Two redundant 5V/12V power supply controllers 610 are, at least, dedicated to the disk drives 608.

Also shown in FIG. 6 is a schematic for the bezel module layout 614 of the bezel module 202 of FIG. 2A. The bezel module layout 614 shows two fans 612 (which optionally can serve as redundant units), a reset button 616 for resetting power to just the retractable media drawer 200 and not the entire HDA unit 100, and status LEDs. The status LEDs can include, for example, a system status LED, individual drive status LED, Ethernet status/Ethernet ports system management LEDs, or any other activity indicating device. As one skilled in the art will appreciate, there are a number of optional board layouts the can complete the primary function of the board 502 which is to transmit power to components associated with the board 502 and direct communication between at least a drive 608 and a server, for example.

Figure 7:
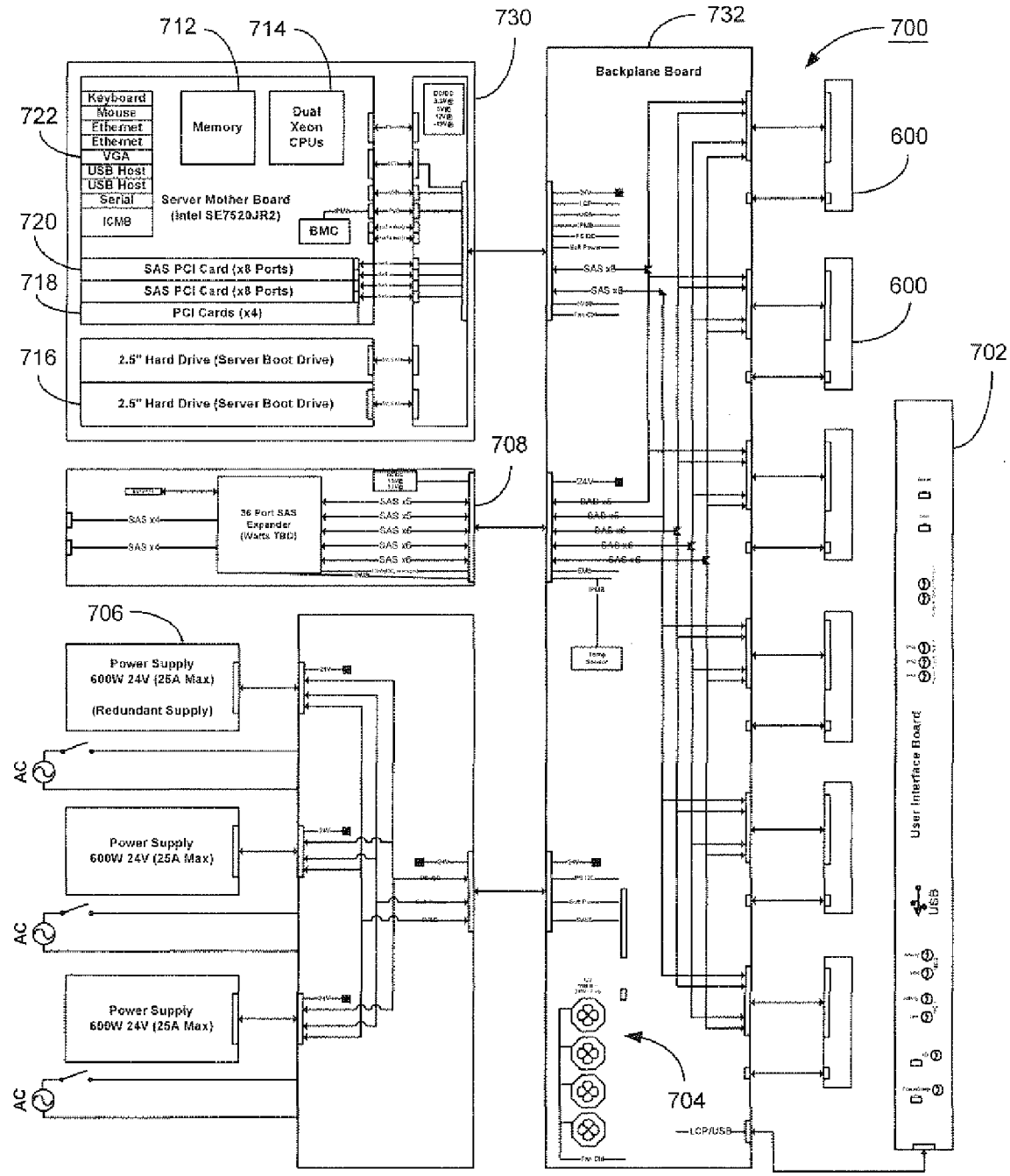
FIG. 7 is an illustrative embodiment of one optional configuration of an HDA unit schematic layout consistent with embodiments of the present invention.

FIG. 7 is an illustration of one optional configuration of an HDA unit schematic layout 700 consistent with embodiments of the present invention. As shown, the HDA layout 700 generally comprises a server unit layout 730, a 36-port SAS Expander port layout 708 (or optionally redundant 36-port expanders), a power supply system layout 706 with redundancy, a backplane board layout 732, a user interface board layout 702 and six drawer plate board layouts 600 as shown in detail in FIG. 6. With reference to the server unit layout 730, shown therein are redundant server boot drives 716 (but as one skilled in the art would recognize, alternative storage devices could be used in place of a boot drive 716), redundant SAS PCI cards 720 each comprising eight ports and location for accommodating four additional PCI cards 718, user interface 722, dynamic memory 712 and dual CPU (Central Processing Units) 714. The six drawers 600 and user interface board 702 connect to the backplane board 732 through which power is transmitted and communication can be exchanged. The backplane board 732, in this configuration, is capable of providing power and control to four (or more or less) cooling fans 704. The HDA unit 100 can show a low level operational status and basic functionality for an operator via the user interface board 702 which can comprise a power switch, a reset switch, and identification button for various elements within the HDA unit 100, USB connectors for flash key drives, keyboard and mouse connections from the front of the unit 100, wireless devices, etc., in addition to status lights for general system status, Ethernet status, etc. Optional configurations can include additional port expanders and more complex server/motherboard system(s) without deviating from the spirit of the present invention.

FIG. 5A is an illustration of an interconnected multi-HDA system schematic layout 800. As shown, three HDA units 822, 824 and 826 are interconnected through respective routers 803, 805, 807, such as dual 36-port SAS expanders, and servers 802, 804 and 806. The third HDA unit 826 can be connected to a network client 816 over a pathway such as ISCSI, Ethernet, Fiber channel, etc. The server boxes 802, 804 and 806 can, optionally, be interconnected further serving as a failsafe in the event a server box fails. All HDA units 822, 824 and 826 can function independently saving data on each of the associated retractable media drawers 810, 812, 814. As will be appreciated by a skilled artisan, there are a variety of ways to interconnect the multiple HDA units 822, 824 and 826 with the general interconnected functionality as shown without deviating from the present invention. It should also be clear that the three HDA units 822, 824 and 826 are illustrative and that a multi-HDA system can comprise an unlimited number of HDA units.

FIG. 5B is an illustration of a master, or primary, HDA and add-on storage media unit layout 850. In this configuration, two add-on storage media units 832 and 834 are interconnected through routers 841 and 843, respectively, whereby the server 806 operates as a master unit for all of the retractable media drawers 814, 840 and 842. The HDA unit 826 can also interface with a client 816. As will be appreciated by a skilled artisan, there are a variety of ways to interconnect a master HDA unit 826 with multiple add-on units 832 and 834 while preserving the general interconnected functionality as shown without deviating from the spirit of the present invention.

Figure 8A:
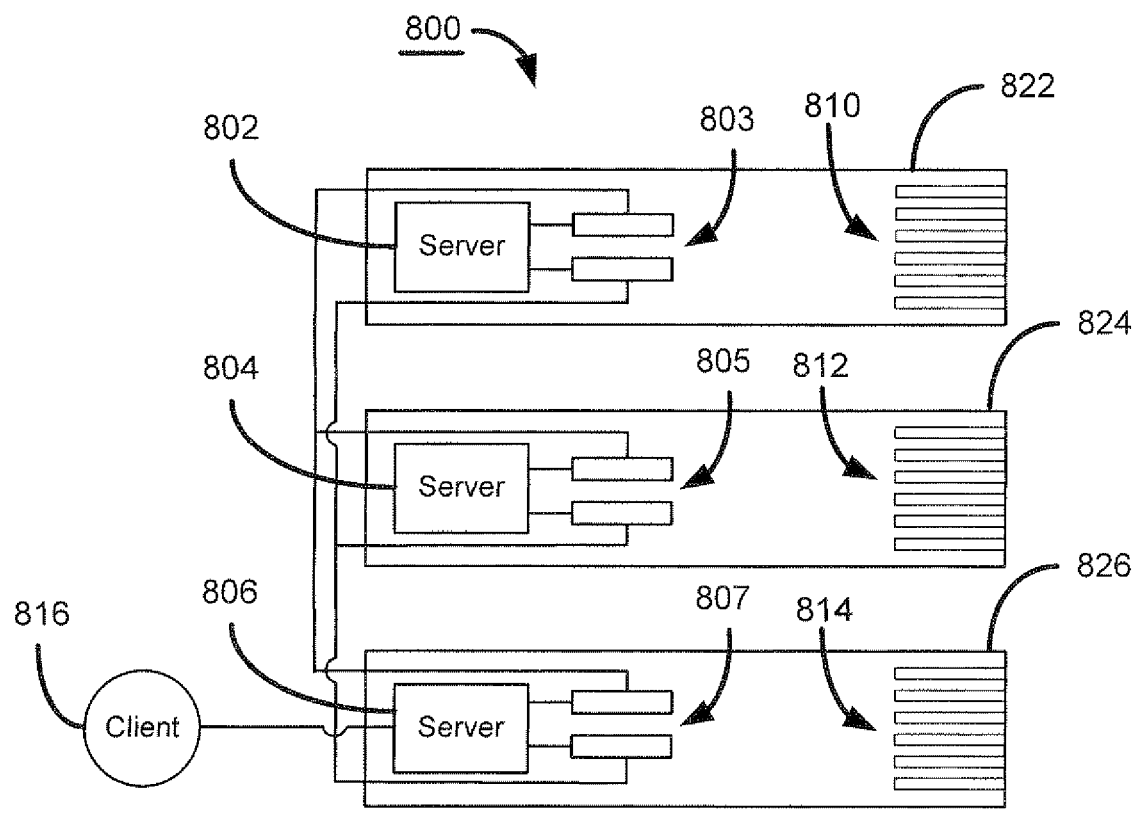
FIG. 8A is an illustration of an interconnected multi-HDA system schematic layout consistent with embodiments of the present invention.
Figure 8B:
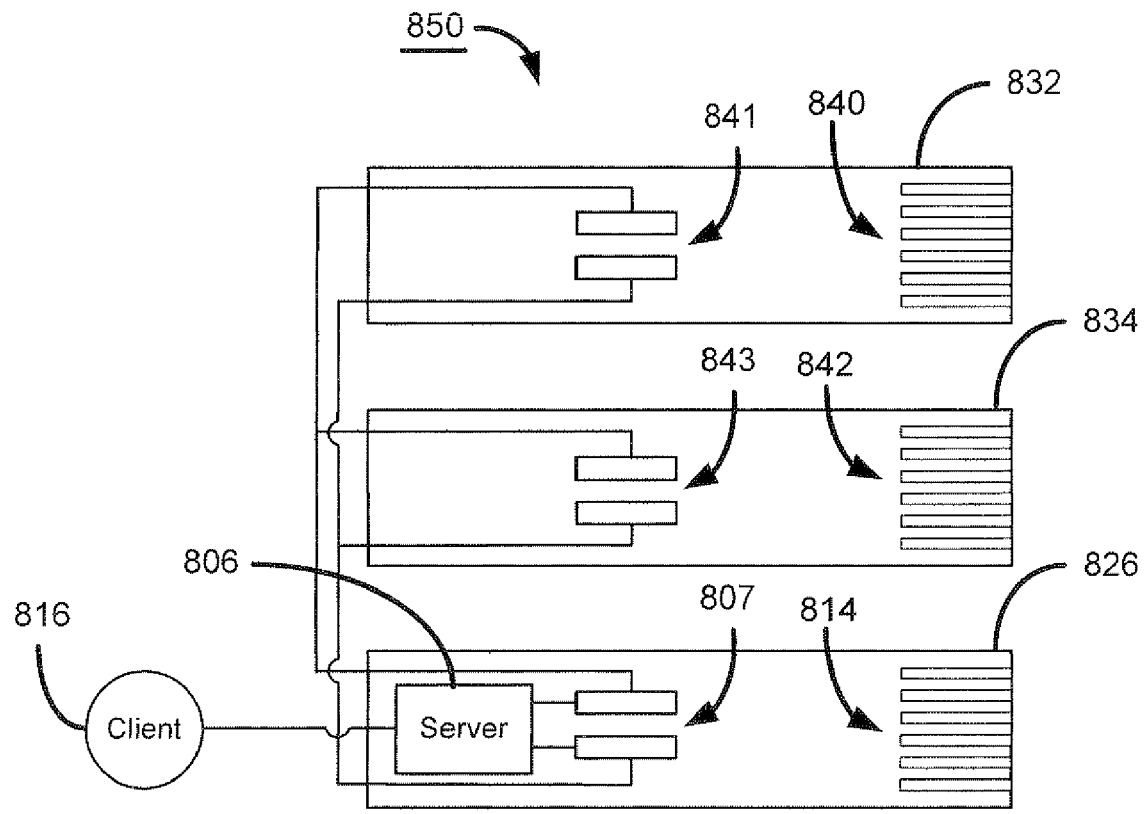
FIG. 8B is an illustration of a master HDA and add-on storage media unit layout consistent with embodiments of the present invention.
Figure 8C:
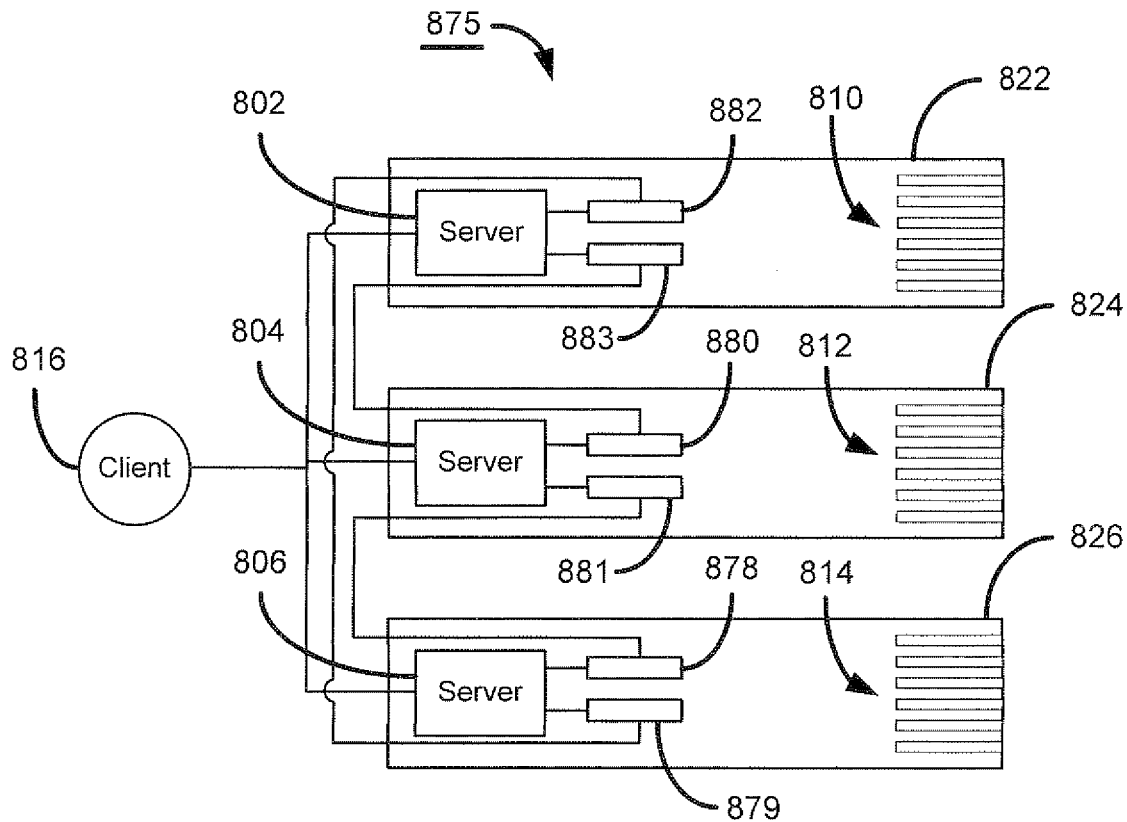
FIG. 8C is an illustration of a looped connected multi-HDA system schematic layout consistent with embodiments of the present invention.

FIG. 8C is an illustration of a looped connected multi-HDA system schematic layout 875. As shown, the client 816 can be in communication with the three HDA units 822, 824 and 826 over a network. In one embodiment, a server, such as server 806, can be the primary, or active, server and the other servers 802 and 804, passive servers. As shown, a first HDA unit 826 is connected to a second HDA unit 824 via a first port expander 878 associated with the first HDA unit 826 and a second port expander 881 associated with the second HDA unit 824. The second HDA unit 824 is connected to a third HDA unit 822 via a third port expander 880 associated with the second HDA unit 824 and a fourth port expander 883 associated with the third HDA unit 822. Optionally, the third HDA unit 822 can be connected to the first HDA unit 826 via fifth port expander 882 associated with the third HDA unit 822 and a sixth port expander 879 associated with the first HDA unit 826. In the event a server fails, such as the second server 804 associated with second HDA unit 824, a different server, such as the first server 806 associated with first HDA unit 826, can function as the active server effectively bypassing the failed second server 804. In one embodiment of the present invention, a server unit, such as server 804, can be configured to be hot-swappable, that is removable without interruption to the system. The HDA units, such as the second HDA unit 824, can be adapted to accommodate the second server 804, or any number of different modular units such as another server or RAID controller for example, in a universal module space (described in detail in FIG. 11) whereby the server 804 can be removed without interruption to the system 875. For example, the bypassing functionality effectively bypassing a failed server unit can be identically used to bypass a server with a mother board if removed from the system, such as the system 875, when in operation without interruption to the system.

Figure 8D:
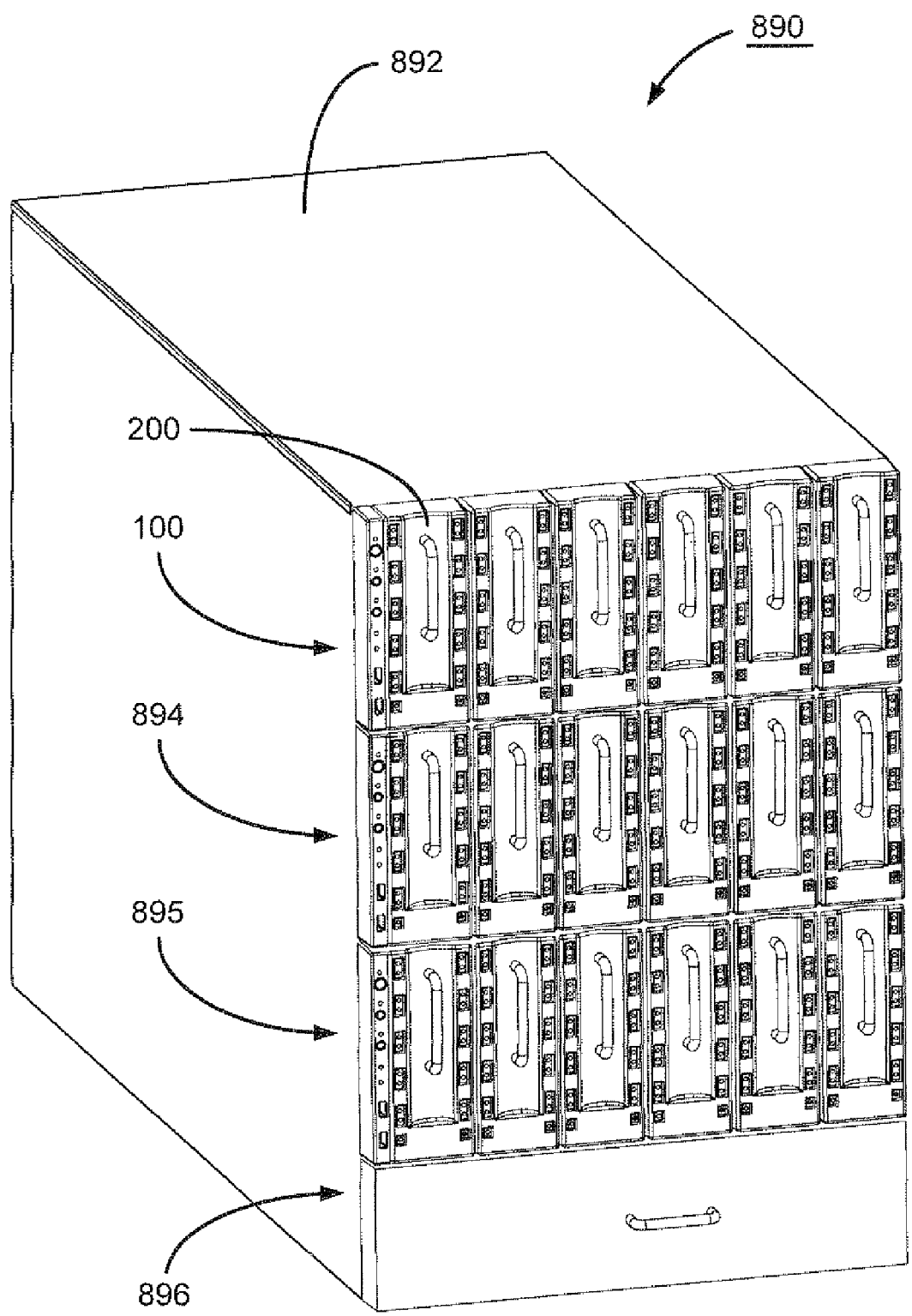
FIG. 8D is an illustrative embodiment of a storage system comprised in part of data storage units having retractable media drawers consistent with embodiments of the present invention.
Figure 8E:
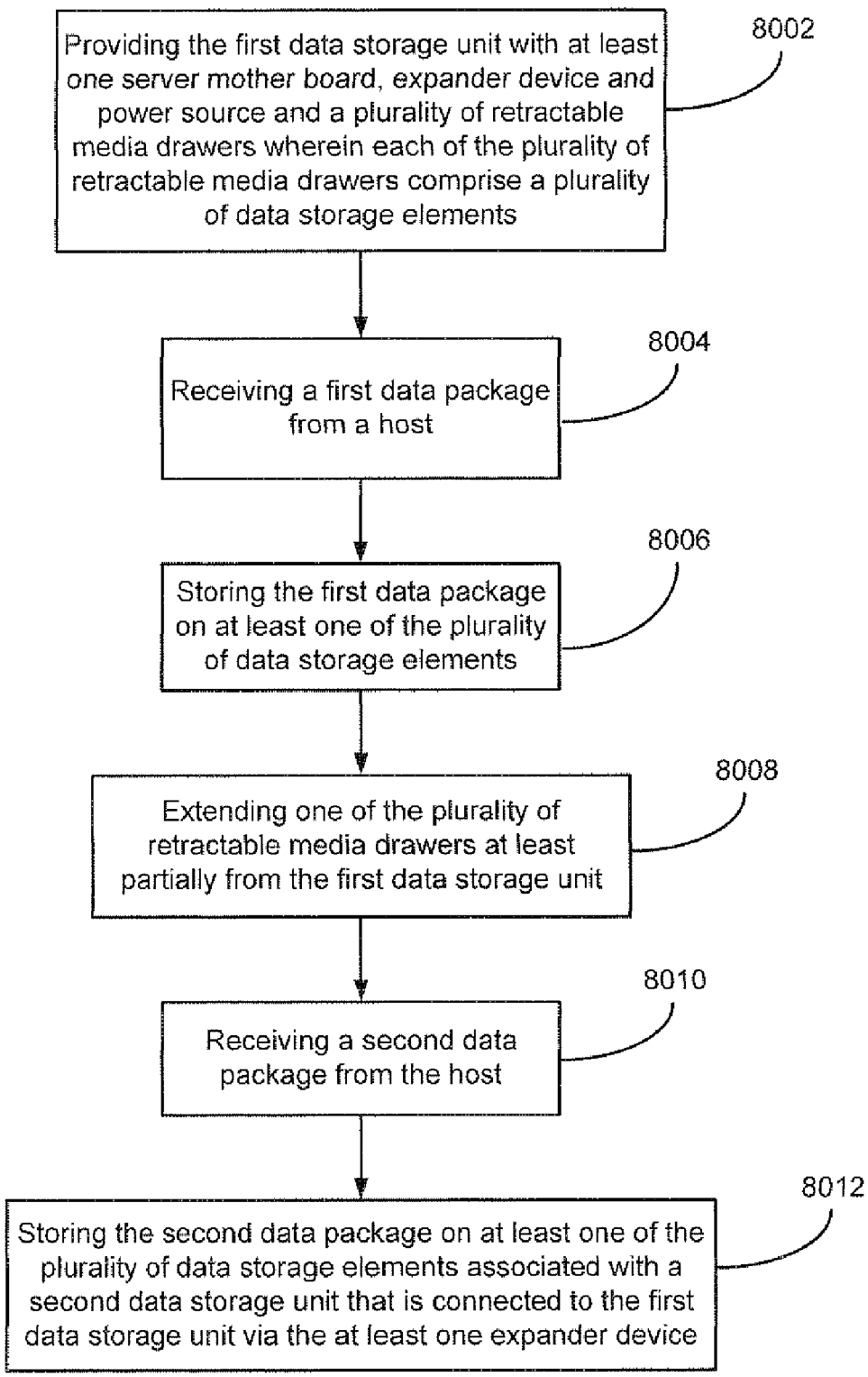
FIG. 8E is a block diagram that shows a method for operating a storage unit consistent with embodiments of the present invention.

Referring now to FIG. 8E, shown therein is a method to practice an embodiment of the present invention. It should be recognized that the steps presented in the described embodiments of the present invention do not require any particular sequence unless otherwise stated. Also, similar elements are used from FIG. 1B in conjunction with FIG. 8E for purposes of illustration in this embodiment but are not intended to limit the methods presented herein to the elements of FIG. 1B and FIG. 8E. As shown in block 8002 in FIG. 8E, a method of operating a first data storage unit (for convenience the illustrative example of the first data storage unit will be the data storage unit 100 of a data storage system 890 which includes at least a first and second data storage unit, such as unit 100 and 896) can include a step of providing the first data storage unit with at least one server mother board, expander device and power source and a plurality of retractable media drawers wherein each of the plurality of retractable media drawers comprise a plurality of data storage elements. It is to be understood by those skilled in the art that a data storage unit, such as the unit 100, may comprise additional elements and features not disclosed herein, such as plugs, boot drives, fans, vents, etc., without departing from the scope and spirit of the present invention. In step 8004, a first data package is received from a host computer, such as a client or server 101 shown in FIG. 1A, by the data storage system 890, and in one embodiment specifically one of the data storage units, such as unit 100 functioning as a master unit. A master unit, such as unit 100 is a unit that has some level of influences over other the units, such as units 894, 895 and 896 for example (sometimes referred to as slave units). In certain instances, a master unit will have additional functionality over other connected units such as being the system's bus master or communication link with a host or first to control communication flow or first interrupt or other primary system controller functionality, just to name several examples of the master slave relationship. In other embodiments of the present invention, a master and slave relationship between units may not exist. The first data package can be a file, a plurality of files or some other data transmission and can be received in any number of conceivable formats. The first data package can then be stored, as shown in step 8006, to at least one of the plurality of data storage elements, such as a disk drive 105 disposed on a retractable media drawer, which for convenience is shown as the media drawer 102 but can be equally applicable to any of the media drawers shown in FIG. 1B and FIG. 8D. As indicated in step 8008, one of the retractable media drawers 102 can be extended at least partially from the data storage unit 100. In one embodiment of the present invention the retractable media drawers, such as drawer 102, can be extended, retracted, or between extended and retracted, while maintaining connectivity, that is, without interruption of power and of storing the first data package. The data storage system 890 can receive additional data packages, such as a second data package from the host, as shown in step 8010. In an alternative embodiment, the second data package can be received by either the first data storage unit 100 or the second data storage unit 896 and transferable therebetween. It is conceivable that the term "a host" can be one or more host computers in communication with the data storage system 890. As shown in step 8012, the second data package is stored on at least one of a plurality of additional data storage elements associated with a second data storage unit, such as the data storage unit 896, that is connected to the first data storage unit 100 via said at least one expander device, not to be limited by the example of the expander devices 803, 805 and 807 of FIG. 8A of the storage system 800. A means for connecting the first data storage unit 100 to the second data storage unit 896 can be by wireline or some other conductive pathway to connect at least power between the two units 100 and 896 and optionally a wireless method for data transferring data. There are a variety of wireless techniques to transfer data known to those skilled in the art that are applicable in embodiments of the present invention. In yet another alternative embodiment, the should a component of the master storage unit 100 fail, become inoperable, or simply undesirable (or the entire master storage unit 100), such as a server mother board, expander device, power source or other component, the second data storage unit (or slave unit) 896 can become the master storage unit thus providing an uninterruptible back-up service. In another embodiment of the present invention, any or all of the storage units can be configured to provide a retrievable version of a data package stored such as by creating redundant copy of the data, RAID striping of the data or by some other method of creating a retrievable version of the data should any portion of the originally stored version of the data become corrupt or lost. It should be readily apparent that the illustration of the method described is directed to a first storage unit 100 and second storage unit 896 but can also include a third storage unit 894 and so on.

Referring now to FIG. 8E, shown therein is a method to practice an embodiment of the present invention. It should be recognized that the steps presented in the described embodiments of the present invention do not require any particular sequence unless otherwise stated. Also, similar elements are used from FIG. 1B in conjunction with FIG. 5E for purposes of illustration in this embodiment but are not intended to limit the methods presented herein to the elements of FIG. 1B and FIG. 5E. As shown in block 8002 in FIG. 8F, a method of operating a first data storage unit (for convenience the illustrative example of the first data storage unit will be the data storage unit 100 of a data storage system 890 which includes at least a first and second data storage unit, such as unit 100 and 896) can include a step of providing the first data storage unit with at least one server mother board, expander device and power source and a plurality of retractable media drawers wherein each of the plurality of retractable media drawers comprise a plurality of data storage elements. It is to be understood by those skilled in the art that a data storage unit, such as the unit 100, may comprise additional elements and features not disclosed herein, such as plugs, boot drives, fans, vents, etc., without departing from the scope and spirit of the present invention. In step 8004, a first data package is received from a host computer, such as a client or server 101 shown in FIG. 1A, by the data storage system 890, and in one embodiment specifically one of the data storage units, such as unit 100 functioning as a master unit. A master unit, such as unit 100 is a unit that has some level of influences over other the units, such as units 894, 895 and 896 for example (sometimes referred to as slave units). In certain instances, a master unit will have additional functionality over other connected units such as being the system's bus master or communication link with a host or first to control communication flow or first interrupt or other primary system controller functionality, just to name several examples of the master slave relationship. In other embodiments of the present invention, a master and slave relationship between units may not exist. The first data package can be a file, a plurality of files or some other data transmission and can be received in any number of conceivable formats. The first data package can then be stored, as shown in step 8006, to at least one of the plurality of data storage elements, such as a disk drive 105 disposed on a retractable media drawer, which for convenience is shown as the media drawer 102 but can be equally applicable to any of the media drawers shown in FIG. 1B and FIG. 8D. As indicated in step 8008, one of the retractable media drawers 102 can be extended at least partially from the data storage unit 100. In one embodiment of the present invention the retractable media drawers, such as drawer 102, can be extended, retracted, or between extended and retracted, while maintaining connectivity, that is, without interruption of power and of storing the first data package. The data storage system 890 can receive additional data packages, such as a second data package from the host, as shown in step 8010. In an alternative embodiment, the second data package can be received by either the first data storage unit 100 or the second data storage unit 896 and transferable therebetween. It is conceivable that the term "a host" can be one or more host computers in communication with the data storage system 890. As shown in step 8012, the second data package is stored on at least one of a plurality of additional data storage elements associated with a second data storage unit, such as the data storage unit 896, that is connected to the first data storage unit 100 via the at least one expander device, not to be limited by the example of the expander devices 803, 805 and 807 of FIG. 8A of the storage system 800. A means for connecting the first data storage unit 100 to the second data storage unit 896 can be by wireline or some other conductive pathway to connect at least power between the two units 100 and 896 and optionally a wireless method for data transferring data. There are a variety of wireless techniques to transfer data known to those skilled in the art that are applicable in embodiments of the present invention. In yet another alternative embodiment, the should a component of the master storage unit 100 fail, become inoperable, or simply undesirable (or the entire master storage unit 100), such as a server mother board, expander device, power source or other component, the second data storage unit (or slave unit) 896 can become the master storage unit thus providing an uninterruptible back-up service. In another embodiment of the present invention, any or all of the storage units can be configured to provide a retrievable version of a data package stored such as by creating redundant copy of the data, RAID striping of the data or by some other method of creating a retrievable version of the data should any portion of the originally stored version of the data become corrupt or lost. It should be readily apparent that the illustration of the method described is directed to a first storage unit 100 and second storage unit 896 but can also include a third storage unit 894 and so on.

A storage unit method can optionally be further defined such that a first position is when at least all of the storage elements are within the interior space. A second position can be when all of the storage elements are out side of the interior space. This method embodiment can further comprising storing the first data redundantly using a RAID level format, such as RAID level-5 for example. In one embodiment, at least one of the plurality of storage elements can be removed from the first retractable media drawer when in the second position without substantially interrupting storing of the first data. The removed storage element can be replaced with a different form factor storage element, a different storage capacity storage element, or a different data handling rate. This method embodiment can further comprise exchanging a modular unit in a universal space that is substantially within the interior space without interruption to the storing of the first data. The modular unit can be of the group consisting of: a JBOD, a server unit, RAID controller, a storage array and a routing unit.

Another storage unit method embodiment can further comprise receiving a second data package from the host; storing the second data package on a second retractable media drawer wherein the second retractable media drawer comprises a second plurality of data storage elements; moving the second retractable media drawer from a first position that is substantially within the interior space to a second position that is less than substantially within the interior space without interrupting the storing of the second data. This can further comprise storing the second data redundantly in a RAID level format on the second retractable media drawer. Alternatively, this can further comprise storing the second data redundantly in a RAID level format across the first and second retractable media drawers.

In yet another aspect of the present invention, a storage system can comprise a first and second storage unit, the storage system capable of performing the steps of: receiving a first data package from a host; storing the first data package on a first retractable media drawer associated with the first storage unit wherein the first retractable media drawer comprises a plurality of data storage elements; moving the first retractable media drawer from a first position that is substantially within the interior space to a second position that is less than substantially within the interior space without interrupting the storing.

This method embodiment can further comprise receiving a second data package from the host; storing the second data package on a second retractable media drawer associated with the second storage unit wherein the second retractable media drawer comprises a plurality of data storage elements; moving the second retractable media drawer from a first position that is substantially within the interior space to a second position that is less than substantially within the interior space without interrupting the storing. This can further comprise storing the second data redundantly in a RAID level format across the first and second storage units. Optionally, this can further comprise the first storage unit controls the storage of the first data on the first unit and the first storage unit controls the storage of the second data on the second unit. Optionally this can further comprise the second storage unit assumes control of the storage of the first and second data if the first storage unit fails to control the storage of the first and second data.

Figure 9:
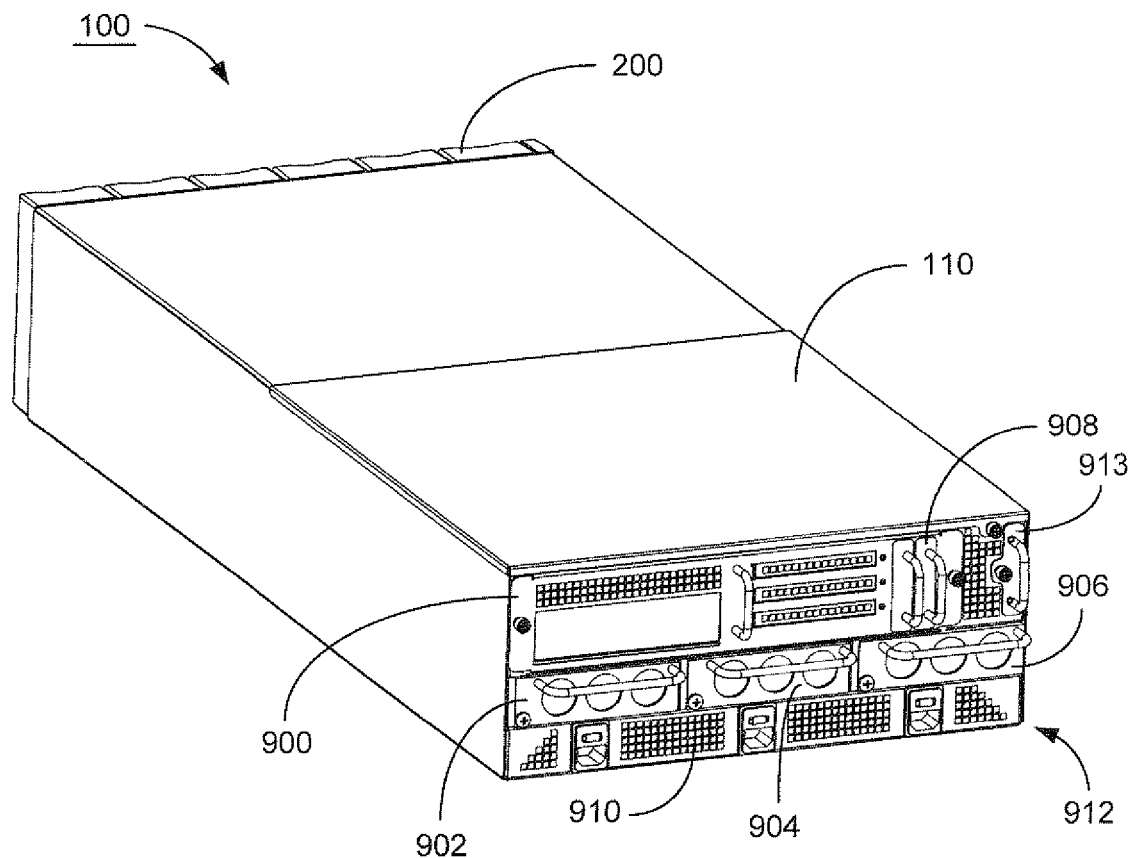
FIG. 9 shows the commercial embodiment of an HDA unit with the back surface presented consistent with embodiments of the present invention.
Figure 10:
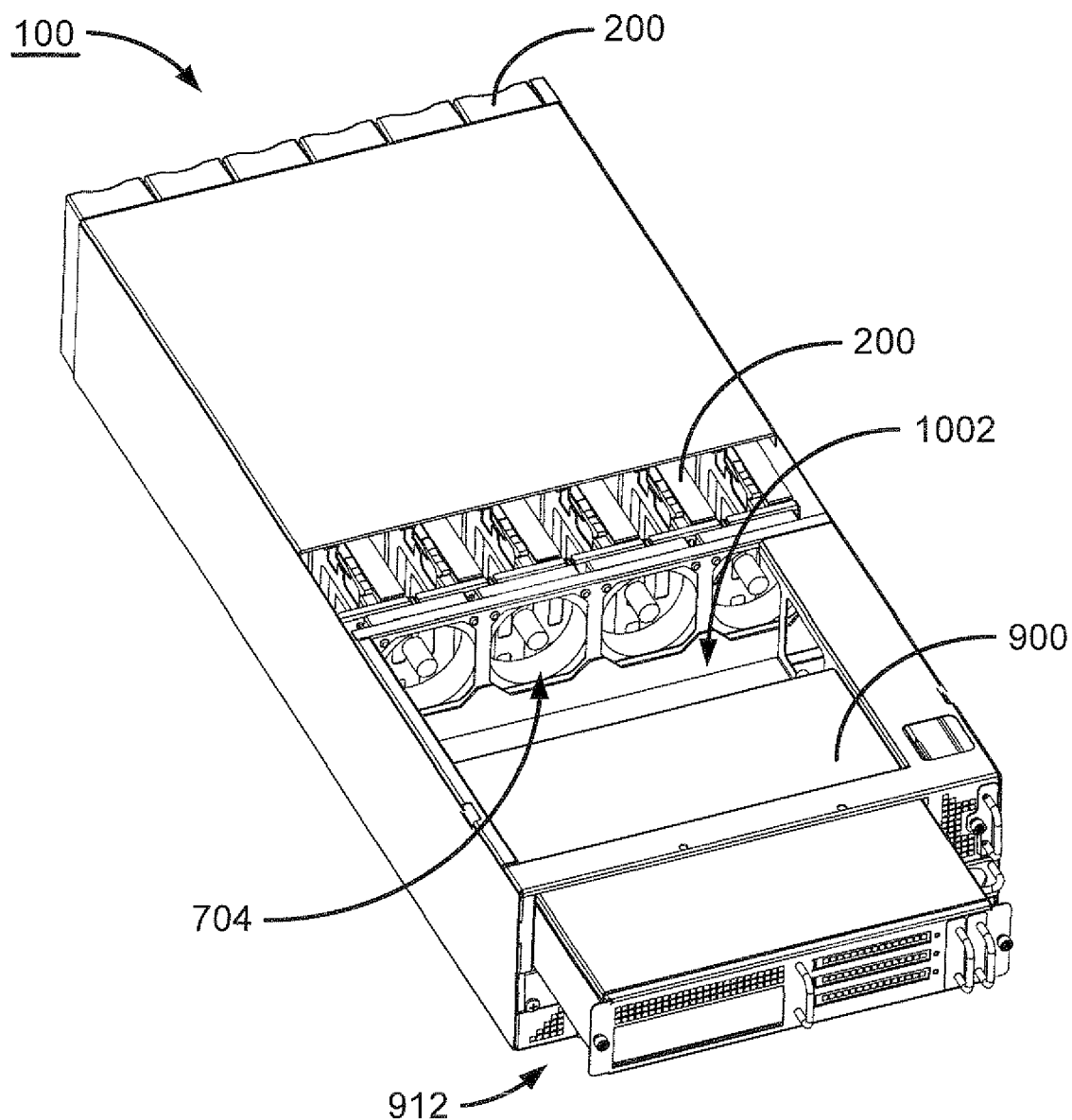
FIG. 10 shows the commercial embodiment of an HDA unit with the back surface presented without the removable panel and a server module partially removed consistent with embodiments of the present invention.

With reference to FIGS. 9 and 10, shown therein is an embodiment of HDA unit 100 with the back surface 912 presented. The HDA unit 100 comprises a removable server unit 900 that can comprise two modular boot drives 908. Also shown are three removable power supplies 904, 904 and 906 and modular port expanders 9. Ventilation holes 910 are shown distributed on much of the back side 912 as shown for general HDA 100 cooling. FIG. 10 shows the HDA unit 100 with the removable panel 110 taken off exposing all interior portion 1002 adapted to accommodate the removable server unit 900 (which is shown partially in the HDA unit 100). In this illustration four of the cooling fans 704 are shown for providing cooling to the retractable media drawers 200.

Figure 11:
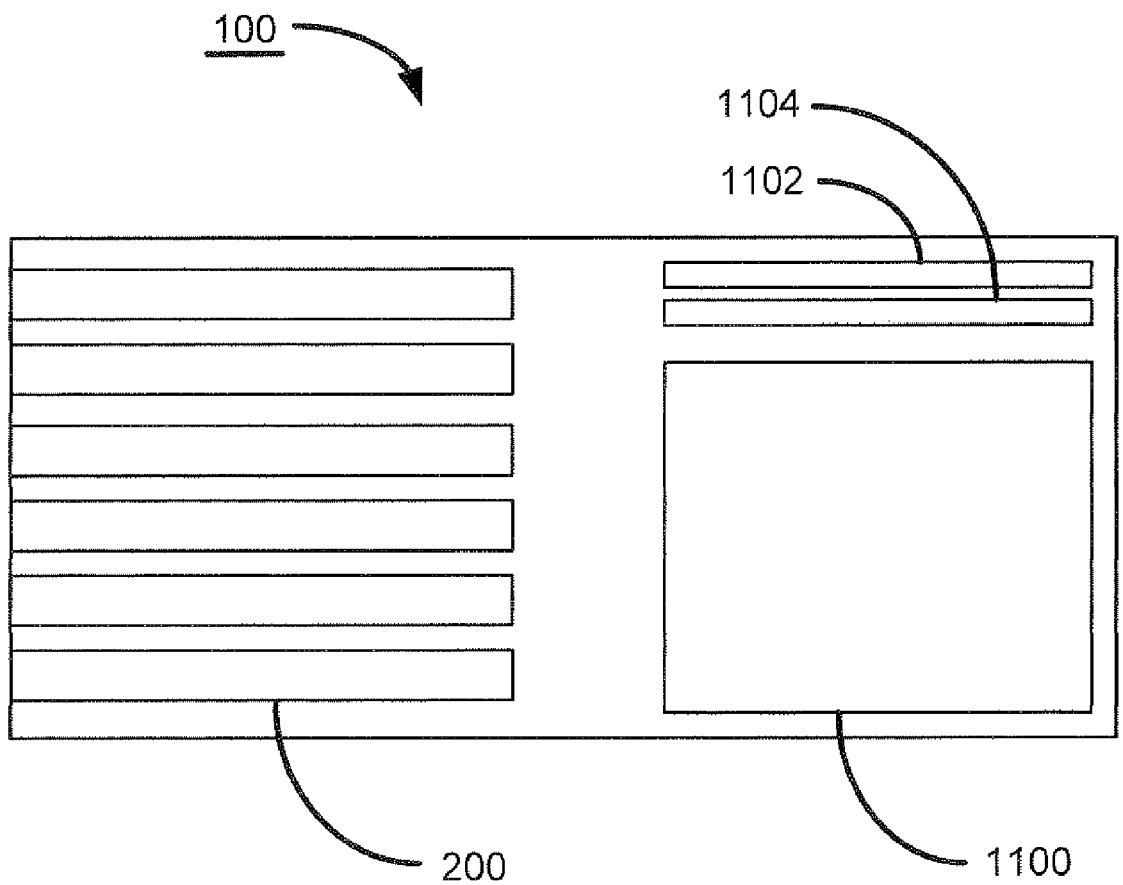
FIG. 11 is a block diagram of a top view of the HDA unit without the cover and removable panel consistent with embodiments of the present invention.

FIG. 11 is a block diagram of a top view of the HDA unit 100 without the cover 106 and removable panel 110. Shown therein are six retractable media drawers 200, a first and second port expander unit 1102 and 1104, respectively, and a universal module space 1100. The universal module space 1100 is adapted to functionally accommodate a variety of modular units, for example, a server, such as the server unit 900 of FIG. 9, a RAID controller, a JBOD (Just a Bunch of Disk [drives]), a channel bridge (such as a SAS to fiber channel bridge), etc. In one embodiment, a modular unit, such as the server unit 900, can comprise a sled apparatus (not shown) adapted to cooperate with features in the universal module space 1100 for efficient insertion and removal from the unit 100. Means to electrically and communicatively link the HDA unit 100 with a module can include a universal set of electrical contacts, or alternatively, specific sets of contacts disposed in the HDA unit 100 dedicated for specific modular units. As one skilled in the art will appreciate, there are a variety of ways to link a module with the HDA unit 100 when installed in the universal module space 1100. An external server can interact with the HDA unit 100 via the port expander units 1102 and 1104, or equivalent routing system (s).

Generally speaking, in one aspect of the present invention, a storage unit can comprise: a cover at least in part defining a storage unit interior space; at least one media drawer capable of removably supporting a plurality of storage elements; the media drawer adapted to provide at least a communication pathway and power between the storage elements and the storage unit; the media drawer capable of being at least partially moved into and out from the interior space without interruption of the power and communication. The storage unit can further comprise a latch mechanism to prevent the media drawer from totally being removed from the unit interior space. The storage unit can further be adapted to be received by an accommodating opening in the frame. Additionally, the storage unit can be adapted to accommodate six media drawers.

The media drawer can be partially moved between a retracted position wherein substantially all of the storage elements are within the interior space and an extended position wherein substantially all of the storage elements are external to the interior space. Additionally, the storage drawer can be retained by a locking mechanism and supported by the storage unit when in the extended position.

The storage unit can optionally comprise storage elements selected from one of the group consisting of: a disk drive, flash memory (or other kind of solid state storage memory), compact disk, magneto-optical drive, floppy disk drive aid holographic drive.

The power and communication can be provided to the media drawer by a power and communication linking device selected from one of the group consisting of a ribbon cable, at least one independent conductive wire, a flexible cable, at least one group of conductive wires. Additionally, the power and communication linking device can comprise a tangling prevention device. Furthermore, the tangling prevention device can be a flex chain linkage. Optionally, the tangling prevention device can be a spring loaded spindle. The power can be provided by a brush and conductive lead system and the communication can be transmitted wirelessly.

The retractable media drawer of the storage unit can comprise a base for supporting a base board through which the communication and power can be transmitted, a bezel module, a mid-plane frame, drawer power connector and drawer communication connector. The drawer base can accommodate a plurality of storage element power and communication connectors for the storage elements. The storage element power and communication connectors can be Serial Attached Small Computer System Interface connectors. The bezel module can be removably attached to the retractable media drawer and comprises a handle, at least one indication light associated with each of the storage elements, at least one fan speed controllable and a drawer reset button. The drawer power and drawer communication connectors connect to the power and communication linking device. The storage elements can be disposed on either side of the mid-plane frame. The storage elements can be disk drives wherein the disk drive can optionally be at least two different storage density capacities, different disk rotation speeds, or different disk drive form factors. In the embodiment wherein the storage elements are disk drives magnetic disks comprised by the disk drives can rotate in opposite directions when mounted on opposite sides of the mid-plane frame. The storage elements can optionally be mounted to a mid-plane retaining plate that cooperates with the mid-plane to hold the storage elements substantially in place when electrically connected to the base board. The retaining plate can accommodate alternate form factor storage elements. The retractable media drawer can further comprise a latch mechanism to removably and substantially lock the storage element to the drawer. The base board of the drawer further can comprise storage element activity indicators for each storage element corresponding to the at least one indication light associated with each of the storage elements on the bezel board. The storage element activity indicators can be Light Emitting Diodes located in proximity to each storage element. As a skilled artisan would recognize, other light indicating devices/emitters or light sources and reflecting devices, etc. can be used to accomplish the same result as a Light Emitting Diode without departing from the present invention. The storage unit can further be adapted to cooperate with a second storage unit to comprise a storage system capable interacting with a host. All of the storage units can be substantially identical, or optionally the second storage unit can be just a bunch of storage elements or drives (JBOD) such as, for example, capable of being field adaptable to be able to switch from a JBOD to full operating mode. Both storage units can each further comprise a universal module space located in the interior space adapted to accommodate a server module, i.e. a first modular server unit for the original storage unit and a second modular server unit for the second storage unit. The first modular server unit can function as a master server unit taking over server operations for both the original storage unit and the second storage unit. Optionally, the second modular server unit can be made to function as the maser server unit. In one embodiment, the second modular server unit can be made to function as the maser server unit when the first server unit fails wherein functionality of the system remains uninterrupted. In an alternative embodiment, the second modular server unit can be made to function as the maser server unit when the first server unit is removed in a hot-swap operation wherein functionality of the system remains uninterrupted. The storage system can comprise a third storage unit wherein the storage units can be interconnected through a loop system wherein the storage unit from claim 1 is connected to the second storage unit and the second storage unit is connected to the third storage unit. The storage units can all interconnected via router devices. Optionally, the original storage unit can be connected to both the second storage unit and the third storage unit; the second storage unit can be connected to both the original storage unit and the third storage unit.

In yet another aspect of the present invention, a storage system comprising at least one storage unit, the storage unit can comprise a frame defining a storage unit interior space; at least one media drawer capable of removably supporting a plurality of storage elements wherein the media drawer is adapted to provide a communicating path between the storage elements and the storage unit; the media drawer capable of moving between a retracted position wherein substantially all of the storage elements are within the interior space and an extended position wherein substantially all of the storage elements are external to the interior space; a means to provide uninterrupted power and communication to the media drawer when the media drawer is at or between the retracted and extended positions.

In yet another aspect of the present invention a storage unit comprising a frame that defines and interior space, a means for storage unit operation can comprise: means for receiving a first data package from a host; means for storing the first data package on a first retractable media drawer wherein the first retractable media drawer comprises a plurality of data storage elements; means for moving the first retractable media drawer from a first position that is substantially within the interior space to a second position that is less than substantially within the interior space without interrupting the storing.

Optionally, the means plus function embodiments can further include, means for storing the first data redundantly using a RAID level format. Means for further receiving a second data package from the host; means for storing the second data package on a second retractable media drawer wherein the second retractable media drawer comprises a second plurality of data storage elements; means for moving the second retractable media drawer from a first position that is substantially within the interior space to a second position that is less than substantially within the interior space without interrupting the storing of the second data.

The means plus function can further comprise means for storing the second data redundantly in a RAID level format on the second retractable media drawer or optionally means for storing the second data redundantly in a RAID level format across the first and second retractable media drawers.

The means plus function can further comprise means for exchanging a modular unit in a universal space that is substantially within the interior space without interruption to the storing of the first data.

In another aspect of the present invention, a storage system comprising a first and second storage unit, a means for the storage system to operate can comprise: a means for receiving a first data package from a host; a means for storing the first data package on a first retractable media drawer associated with the first storage unit wherein the first retractable media drawer comprises a plurality of data storage elements; a means for moving the first retractable media drawer from a first position that is substantially within the interior space to a second position that is less than substantially within the interior space without interrupting the storing.

The means plus function can further comprise means for receiving a second data package from the host; means for storing the second data package on a second retractable media drawer associated with the second storage unit wherein the second retractable media drawer comprises a plurality of data storage elements; means for moving the second retractable media drawer from a first position that is substantially within the interior space to a second position that is less than substantially within the interior space without interrupting the storing. Additionally, this can further comprise a means for storing the second data redundantly in a RAID level format across the first and second storage units.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, alternate board layouts and features specific to market needs can be used with an HDA, such as the HDA system 800, for example, while still maintaining substantially the same functionality without departing from the scope and spirit of the present invention. Another example can include various means to provide uninterrupted power and communication to a retractable media drawer, such as the retractable media drawer 200, when moved between a retracted and extended position while still maintaining substantially the same functionality without departing from the scope and spirit of the present invention. Although the preferred embodiments described herein are directed to disk drive systems, such as the disk drive drawer 200, and related technology, it will be appreciated by those skilled in the art that the teachings of the present invention can be applied to other systems and storage media, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed.

What is claimed is:

1. A primary data storage unit comprising:
   a power source;
   at least one server mother board;
   at least one expander device connected to a second data storage unit;
   a plurality of retractable media drawers wherein each of said retractable media drawers comprise a plurality of data storage elements wherein each of said data storage elements are retained by a locking mechanism that at least partially ejects said data storage element when disengaged, and wherein each of said retractable media drawers possesses a fan device,
   each of said retractable media drawers maintaining connectivity to said power source via a conductive cable supported by a flexible tangle inhibiting mechanism that is capable of providing uninterrupted power to said data storage elements and said fan device, said at least one server mother board and said at least one expander device when each of said media drawers is between a first position that is extended partially away from said primary data storage unit and a second position that is at least partially retracted from said first position towards said primary data storage unit.

2. The primary data storage unit of claim 1 further comprising a communication source that is linked to said plurality of data storage elements wherein each of said retractable media drawers maintain connectivity when between said first and second positions, said communication source communicatively linked with a host.

3. The primary data storage unit of claim 1 wherein each of said retractable media drawers are moveable from between said first position and said second position in a drawer like motion.

4. The primary data storage unit of claim 1 wherein said primary data storage unit and said second data storage units are stackable.

5. The primary data storage unit of claim 4 further comprising a third data storage unit.

6. The primary data storage unit of claim 5 further comprising at least a second expander device associated with said second data storage unit and at least a third expander device associated with said third data storage unit wherein said primary data storage unit, said second data storage unit and said third data storage unit are interconnected via said respective associated expander devices.

7. The primary data storage unit of claim 6 further comprising at least a second server mother board associated with said second data storage unit and at least a third server mother board associated with said third data storage unit wherein said primary data storage unit, said second data storage unit and said third data storage unit are interconnected via said respective associated mother boards.

8. The primary data storage unit of claim 5 wherein either said storage unit, said second storage unit or said third storage unit is switchable to be a master storage unit.

9. The primary data storage unit of claim 1 wherein said second data storage unit comprises just a bunch of data storage elements.

10. The primary data storage unit of claim 1 wherein said second data storage unit is substantially like said primary data storage unit.

11. The storage unit of claim 1 wherein said data storage elements are selected from one of a group consisting of: disc drives, solid state memory, compact discs, magneto-optical drives, floppy disc drives, and holographic drives.

12. The primary data storage unit of claim 1 wherein said flexible tangle inhibiting mechanism comprises a linking device that has at least four linkages.

13. The primary data storage unit of claim 1 wherein said data storage elements are disc drives and wherein a first disc drive possesses a first disc that rotates in a direction opposite to a second disc possessed by a second opposing disc drive.

14. A method of operating a first data storage unit, the method comprising the steps of:
providing said first data storage unit with at least one server mother board, at least one expander device and at least one power source and a plurality of retractable media drawers wherein each of said plurality of retractable media drawers comprise a plurality of data storage elements, a fan device, and a locking mechanism associated with each of said plurality of data storage devices that retains each of said data storage devices;
receiving a first data package from a host;
storing said first data package to at least one of said plurality of data storage elements;
extending one of said plurality of retractable media drawers at least partially from said first data storage unit;
removing one of data storage elements from said extended retractable media drawer by disengaging said locking mechanism that upon disengaging causes an ejection system to at least partially eject said data storage element from said extended retractable media drawer;
receiving a second data package from said host; and
storing said second data package to at least one of a plurality of additional data storage elements associated with a second data storage unit that is connected to said first data storage unit via said at least one expander device.

15. The method of claim 14 further comprising maintaining connectivity between said one of said plurality of retractable media drawers and said at least one server mother board, said at least one expander device and said at least one power source during said extending step.

16. The method of claim 14 further comprising receiving a third data package by said second data storage unit and transmitting said third data package from said second data storage unit to said first data storage unit.

17. The method of claim 14 further comprising switching functionality associated with any of said at least at least one server mother board, said at least one expander device and said at least one power source associated with said first data storage unit to at least a back-up server mother board, back-up expander device or back-up power source associated with said second data storage unit.

18. The method of claim 14 wherein said first and said second data storage units are disposed in a data storage system cabinet in a stacked arrangement.

19. The method of claim 14 wherein said storing step includes creating a retrievable version of said first data package should any portion of said first data package become lost.

20. A primary data storage unit comprising:
a power source;
a communication source;
a plurality of retractable media drawers wherein each of said retractable media drawers comprise a plurality of data storage elements, said plurality of data storage elements adapted to store data received from said communication source, each of said data storage elements are retained by a locking mechanism that at least partially ejects said data storage element when disengaged, and wherein each of said retractable media drawers possesses a fan device;
each of said retractable media drawers maintaining connectivity to said power source and said communication source via a conducting cable when each of said media drawers is between a first position that is extended partially away from said primary data storage unit and a second position that is retracted from said first position towards said primary data storage unit;
means for preventing said conducting cable from becoming tangled;
means for connecting at least a second data storage unit with said primary data storage unit.

* * * * *